United States Patent [19]

Kawai

[11] Patent Number: 5,043,916
[45] Date of Patent: Aug. 27, 1991

[54] DATA PROCESSING DEVICE FOR PROCESSING AND DISPLAYING TABLE DATA

[75] Inventor: Shoichi Kawai, Osaka, Japan
[73] Assignee: Sharp Kabushiki Kaisha, Osaka, Japan
[21] Appl. No.: 464,702
[22] Filed: Jan. 16, 1990

Related U.S. Application Data

[63] Continuation of Ser. No. 62,947, Jun. 16, 1987, abandoned.

[30] Foreign Application Priority Data

| Jun. 17, 1986 | [JP] | Japan | 61-142587 |
| Jul. 31, 1986 | [JP] | Japan | 61-181701 |
| Jul. 31, 1986 | [JP] | Japan | 61-181702 |
| Jul. 31, 1986 | [JP] | Japan | 61-181703 |
| Jul. 31, 1986 | [JP] | Japan | 61-181704 |

[51] Int. Cl.⁵ .......................... G06F 15/20
[52] U.S. Cl. ............................ 364/518
[58] Field of Search ........ 364/518; 340/755, 756, 340/792

[56] References Cited

U.S. PATENT DOCUMENTS 4,012,725 3/1977 Spangler et al. ............ 364/200
4,646,081 2/1987 Tsunoda ...................... 340/792

Primary Examiner—Gary V. Harkcom
Assistant Examiner—Mark K. Zimmerman

[57] ABSTRACT

In a data processing device for processing table data, a memory is adapted for storing the table data lined up in matrix shape. The data of each of the table elements can be displayed with the line item name and the row item name in a display unit having a small number of lines so that the table data may have a corresponding identification for a row and a line.

6 Claims, 18 Drawing Sheets

FIG. 3

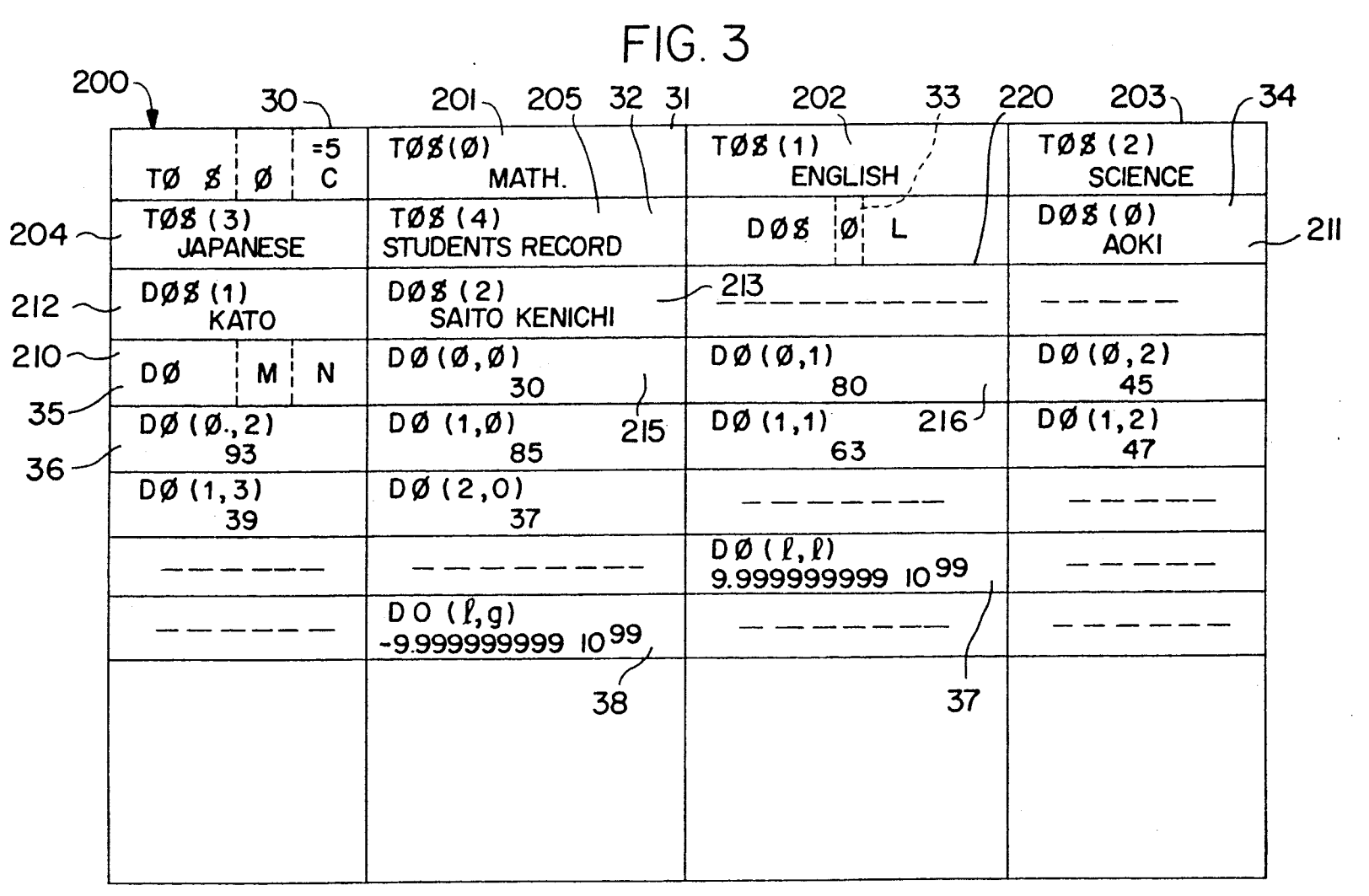

| | 30 =5 C | 201 | 31 32 | 202 33 | 220 | 203 34 |
|---|---|---|---|---|---|---|
| 200→ | TØ$ Ø | TØ$(0) MATH. | | TØ$(1) ENGLISH | | TØ$(2) SCIENCE 211 |
| 204 | TØ$(3) JAPANESE | TØ$(4) STUDENTS RECORD 205 | | DØ$ Ø L 213 | | DØ$(0) AOKI |
| 212 | DØ$(1) KATO | DØ$(2) SAITO KENICHI | | --- | | --- |
| 210 | DØ M N | DØ(0,0) 30 | 215 | DØ(0,1) 80 | | DØ(0,2) 45 |
| 35 | DØ(0,2) 93 | DØ(1,0) 85 | | DØ(1,1) 63 216 | | DØ(1,2) 47 |
| 36 | DØ(1,3) 39 | DØ(2,0) 37 | | --- | | --- |
| | --- | --- | | --- | 37 | --- |
| | --- | DØ(ℓ,g) -9.999999999 10^99 38 | | DØ(ℓ,ℓ) 9.999999999 10^99 | | |

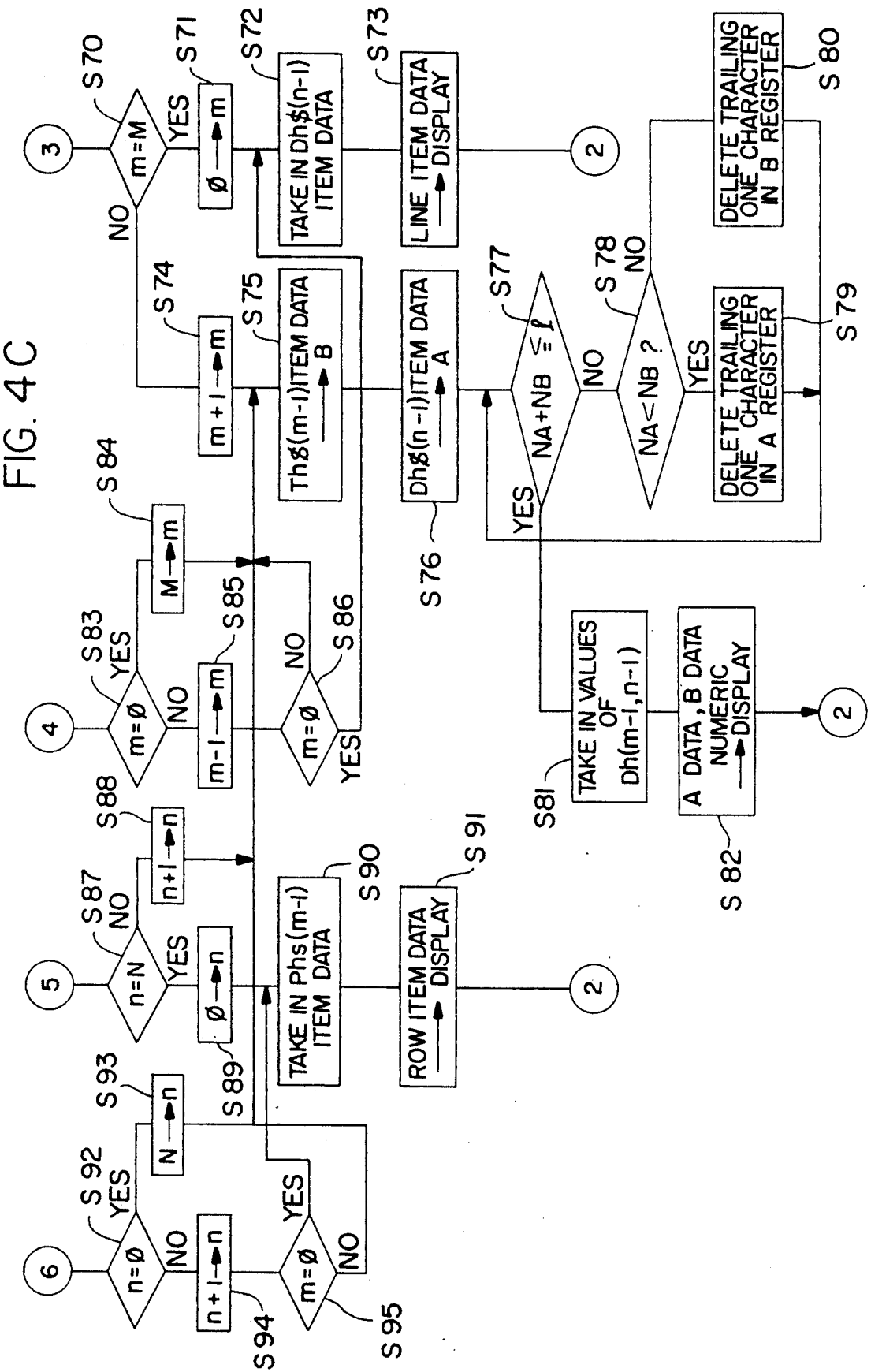

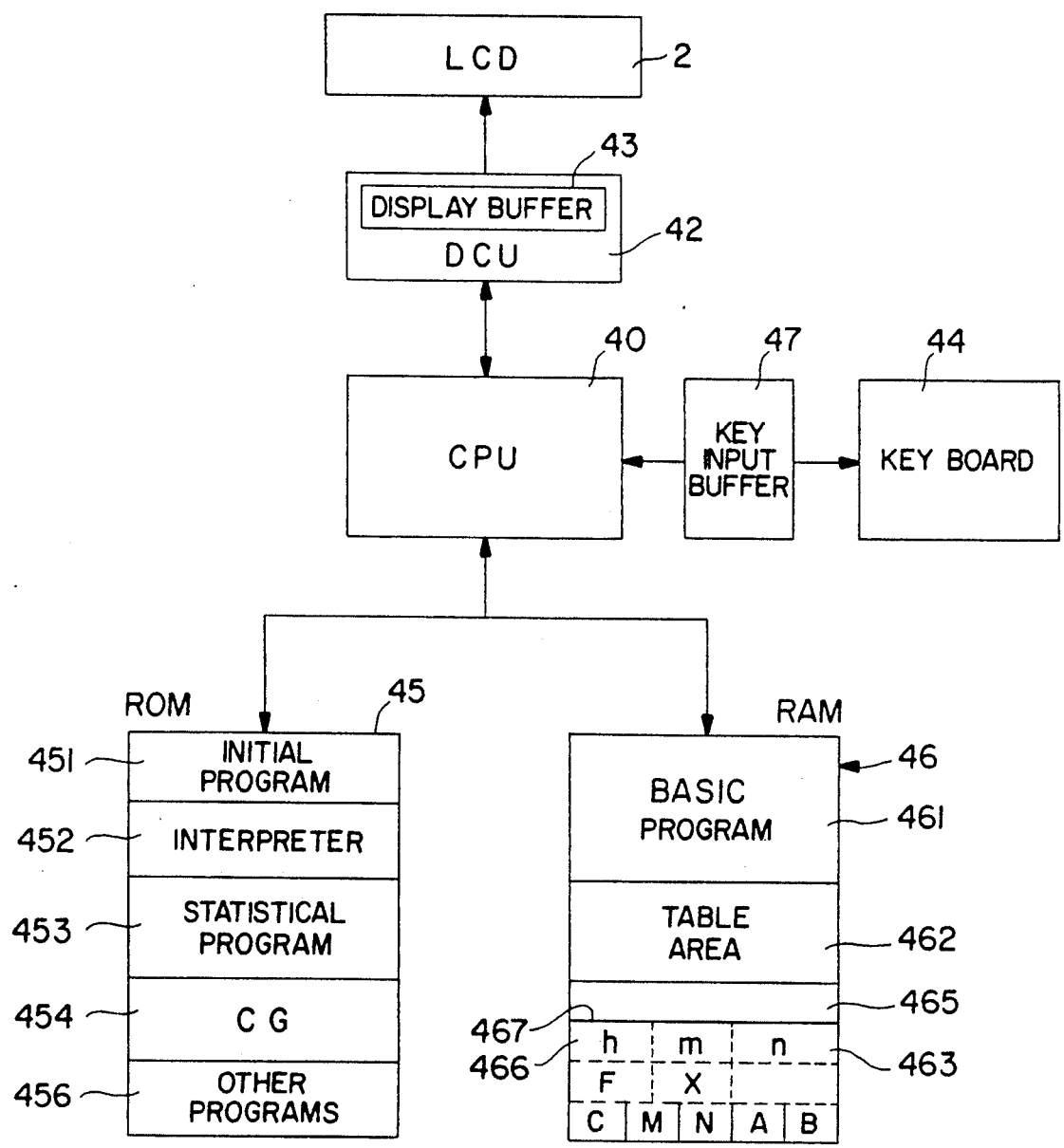

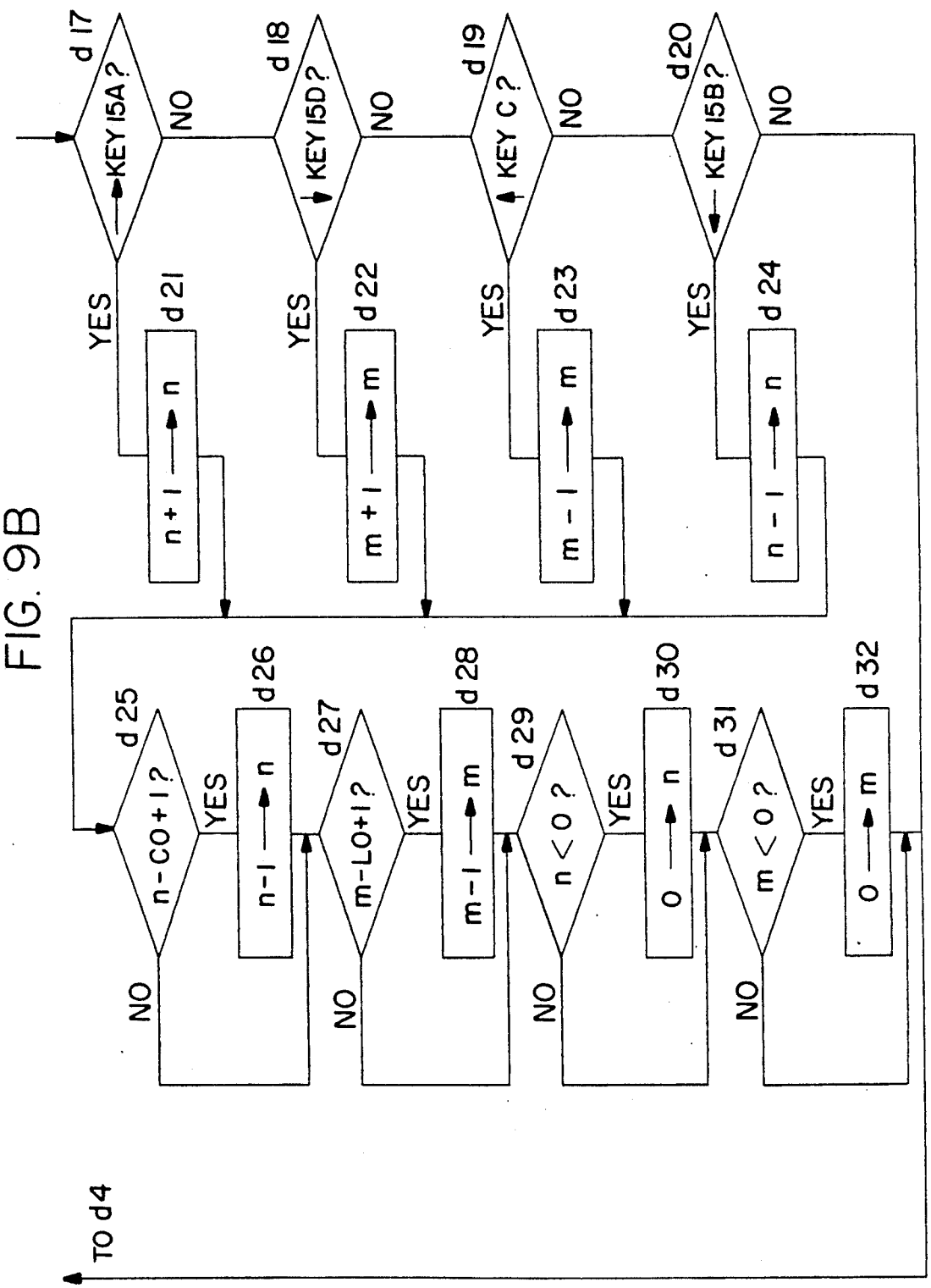

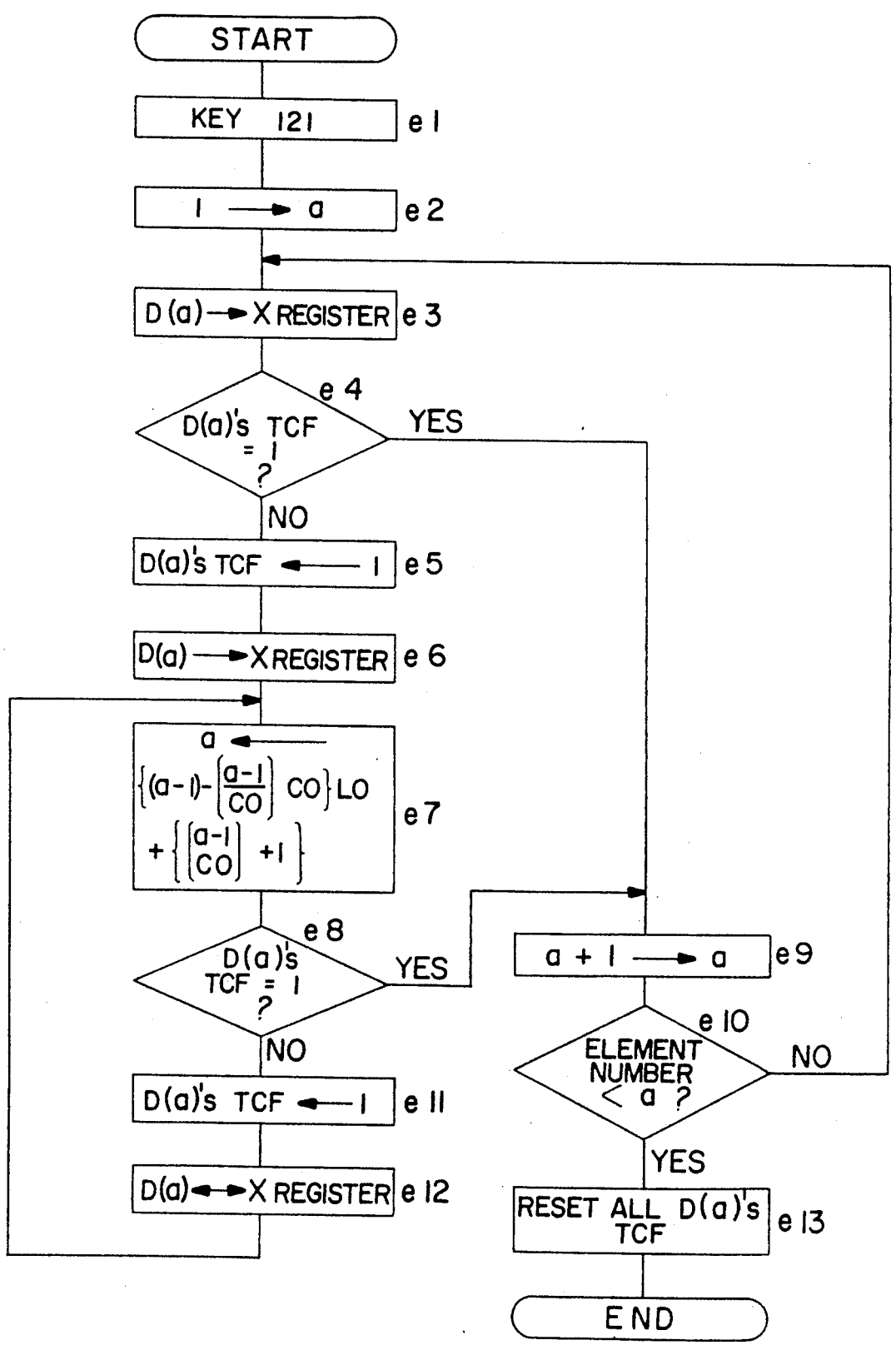

DATA PROCESSING DEVICE FOR PROCESSING AND DISPLAYING TABLE DATA

This applicationn is a continuation of application Ser. No. 062,947 filed on June 16, 1987, now abandoned.

BACKGROUND OF THE INVENTION

1. Field of the Invention

The present invention relates to a data processing device, and more particularly to a data processing device which is suitable for a handy type electronic computer to process various tables.

2. Description of the Prior Art

In order to process or calculate various tables, such as a list of student examination records for various subjects, conventionally there has been employed a relatively large computer with a display unit having display capacity large enough to display the entire contents of the table in a matrix shape of a predetermined number of lines and rows with the title of the table, name the line item and name of the row item. Whereby, the respective elements of the table have been easy to read by the operator.

On the other hand, in small sized computers such as a pocket type computer or a handy type computer, the available display capacity of the display unit provided in the handy type computer is too small because examples of only one or several lines of the entire elements of the table may be displayed. Therefore, when attempting to process the table for example, the student's record must be scrolled at every line of the table on the display unit by the operator in using the conventional handy type computer, since only one line of the table can be displayed. However, the operator can read only numeric data of the table without any identifications such as title of the table (in this example, student examination records) and table item name (in this case the name of the students, and the examination subjects), the operator can scarcely obtain the necessary information of the table.

SUMMARY OF THE INVENTION

An essential object of the present invention is to provide a data processing device which is able to display the necessary information contained in the table having a small display capacity.

Another object of the present invention is to provide a data processing device which is able to process table data by an easy operation.

A further object of the present invention is to provide a data processing device which is able to transpose a line and a row of the table with the use of a relatively small size memory.

A still further object of the present invention is to provide a data processing device suitable for a handy type computer for processing various table data.

According to the present invention, there is a data processing device for processing data of one or more tables. Each table includes a plurality of data elements lined up in a matrix shape having a plurality of lines and a plurality of rows. Each line and each row is able to be identified by a line item name and a row item name. The data processing device includes a memory having a plurality of memory areas for storing the respective data of the table with the line item names and row items names, the memory has a memory capacity for predetermined line numbers, a display device having a display unit of at least one line of characters but less than the line number of the memory, an operating key that is manually and operably arranged in the data processing device for selecting a desired memory area of the memory, and a reading device for reading out the data of the line and row of the table indicated by the operating key with the line and row item names and for causing the data and line and row item names to be displayed on the display unit.

BRIEF EXPLANATION OF THE DRAWINGS

These objects and features of the present invention will become apparent from the following description take in conjunction with the preferred embodiments thereof with reference to the accompanying drawings, in which:

FIG. 3 is a schematic diagram showing an example of the memory map of a memory device used in the data processing device according to an embodiment of the present invention;

FIGS. 4A to 4C are flow charts showing an example of the data processing device according to an embodiment of the present invention;

FIG. 6 is a block diagram showing an example of the present invention;

FIGS. 8, 9A, 9B, 10, 11 and 12 are flow charts showing various embodiments for the data processing device according to the present invention.

DETAILED DESCRIPTION OF THE PREFERRED EMBODIMENTS

Figure 1:
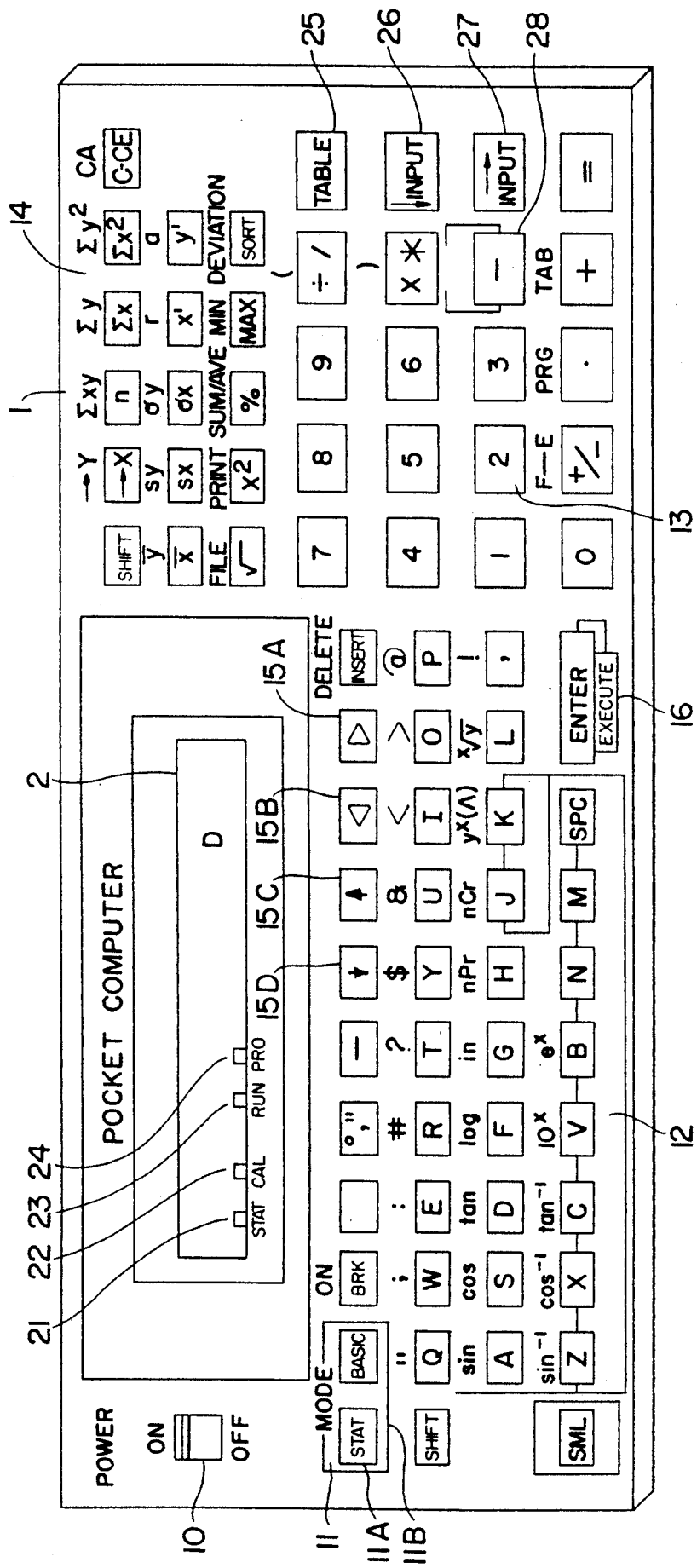
FIG. 1 is a top plan view of an example of a handy type computer in which a data processing device according to an embodiment of the present invention is incorporated.

Referring to FIG. 1 which shows a handy type computer 1 or a pocket computer according to an embodiment of the present invention, a display unit 2 made of LCDs (liquid crystal display device) in an upper portion of the computer 1 and a key board having various character input keys and function keys in peripheral portions of the display unit 2 are provided. The display unit 2 is a dot segment type having one line of 24 digits for displaying numeric characters alphabets, kanas, chinese characters and various functional symbols such as +, −, X or the like. The display unit 2 includes indicators 21, 22, 23, and 24 at the lower portion of the display unit for displaying various operation modes of the computer 1.

The functions of the keys provided in the computer 1 will be described hereinafter.

A power switch 10 is shown. When the power switch 10 is turned on, the power can be supplied to the necessary portions of a circuit arrangement of the computer 1 so that the computer 1 is initialized and set in a statistical operation mode (STAT).

A mode setting key unit 11 is shown which consists of a STAT key 11A for alternately setting the computer 1 in the statistical operation mode (STAT) and a calculation mode (CAL). Every operation of the STAT key 11A and a BASIC key 11B for setting the computer 1 in a processing mode using BASIC language in addition to an operation of switching between a RUN mode in which the computer 1 executes the program and a programming mode (PRO) alternately for every operation of the BASIC key 11B.

During the STAT mode, the indicator STAT 21 is turned on and during the CAL mode, the indicator CAL 22 is turned on. Similarly, during the RUN mode, the indicator RUN 23 is turned on and during the PRO mode, the indicator PRO 24 is turned on.

Character keys 12 are shown which can also operate as function keys. A numeric key group and a calculation instructing key group 13 are shown. Key 28, which is originally a −key, is assigned as a data absent key when a shift key is operated for informing the absence of the data for any items of the table in the statistical operation. A function key group 14 is shown which calculates a deviation value and an average value in the statistical operation mode (STAT). Cursor keys 15A, 15B, 15C and 15D are denoted.

A list key 25 is shown for instructing to prepare and read out one or more desired lists of data of the table for the purpose of the statistical processing. A line input key 26 is shown for selecting one of the items in a direction of the line of the table at the time of preparing the list. A row input key 27 is shown which selects one of the items in a direction of the row of the table.

Figure 2:
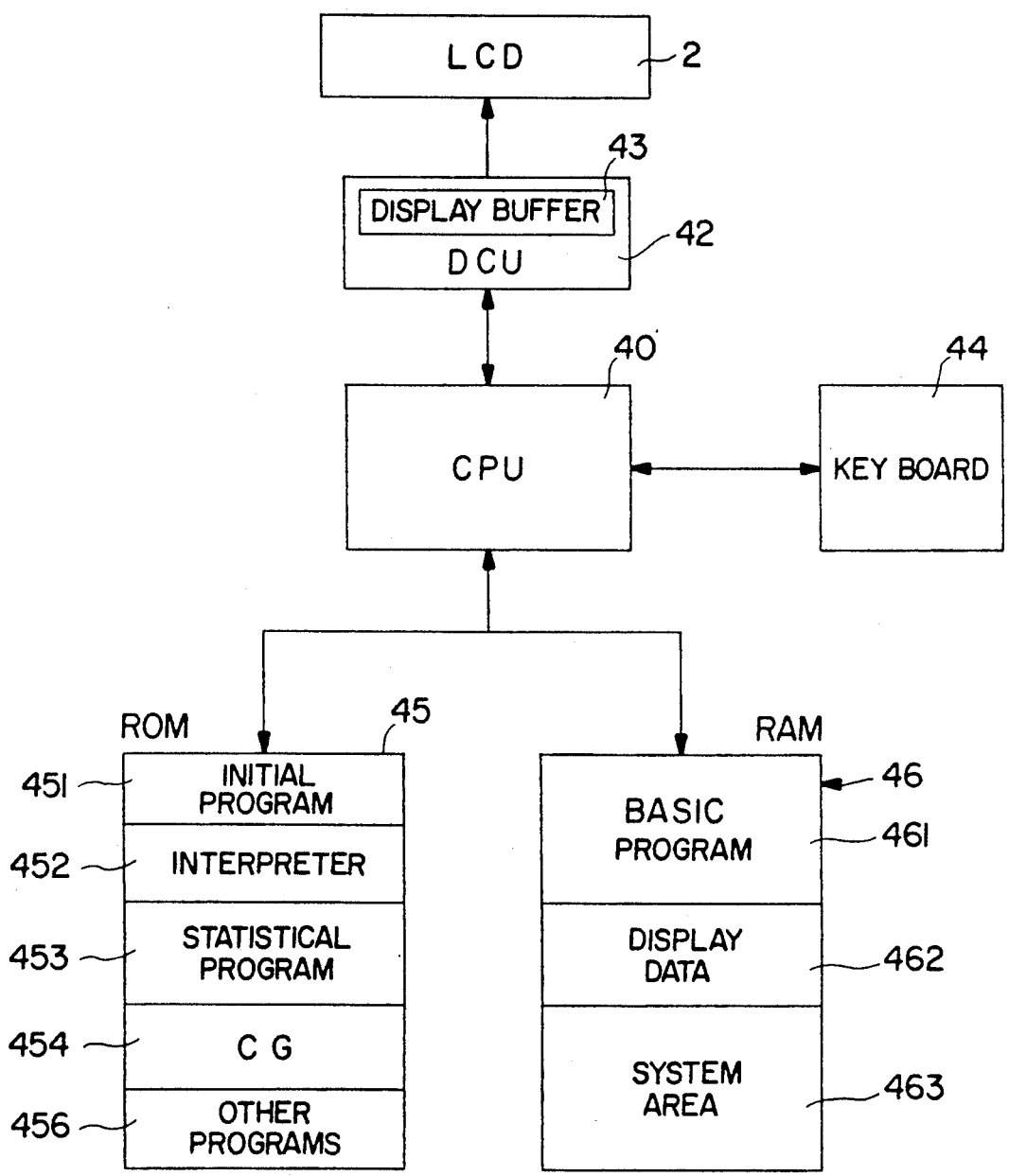
FIG. 2 is a block diagram showing an example of the data processing device according to an embodiment of the present invention.

FIG. 2 shows a circuit diagram of the computer 1 according to an embodiment of the present invention.

A central processing unit 40 is shown (referred to as CPU) for executing data processing according to the control program stored in a ROM (read only memory) 45 which is coupled with the CPU 1 through path lines.

The display unit 2 is driven by a display control unit 42 (abbreviated as DCU in FIG. 2) and is coupled with the CPU 40. The display control unit 42 includes a display buffer 43 for storing the dot data of the information to be displayed on the display unit 2.

The key board 44, as mentioned above, provides coded signals representing the operated keys to the CPU 40.

A ROM 45 includes a first area 451 for storing the initial program, a second area 452 for storing the interpreter of the BASIC language, a third area 453 for storing the program for the statistical processing which will be mentioned later in more detail, a fourth area 454 acting as a character generator which generates coded signals of the dot pattern in response to the code information of the characters and symbols prepared in the CPU 40 and a fifth area 456 for storing various system programs. Preferably, the respective areas 451 to 456 of the ROM 45 may be formed by independent ROM chips.

RAM 46 is coupled to the CPU 40 through bus lines and includes a first area 461 for storing one or more user programs written by a user of the computer 1 in BASIC language, a second area 462 for storing contents of tables prepared by the statistical processing according to the present embodiment and a third area 463 or system area containing various buffers and counters or the like.

The system area 463 includes an h counter, an m counter and an n counter and C, M, N, A and B registers.

The second area 462 is assigned variable data (data of the variables of the table) in an area as shown in FIG. 3. The data shown in FIG. 3 may be stored in the second area 462 at the time of every data entry process or according to the order of assignment of the variable data contained in the BASIC program, whereby the table can be prepared.

The table 1 represents an example of a table used in the present embodiment and FIG. 3 shows how the data corresponding to the table 1 are stored in the second area 462. In FIG. 3, each item of the table is defined by a 16 bit fixed length. Reference numeral 30 in FIG. 3 denotes the name of variables of the row item in the table 1. As shown in FIG. 3, the number of the items (in fact, the number of items +1) is also stored with the name of the variables. The title data is stored in area 31. The title of the table 1 is stored in an area 32.

The name of the variables of items in the respective lines of the table 1 is stored in area 33 with the number of the items in the lines. Each title data is stored in area 34.

The name of the variables of the data is stored in the area 35 with the number of items M and N and the data thereof are stored in area 36.

The respective item data are stored in the RAM 46 at the time of every operation of entering the item data or according to the order of variables of BASIC language. For the purpose of reading out the item data, each item data may be accessed by an address value representing the position of the item data which is calculated based on the number of the item stored with the name of the item.

The way of assigning the respective areas in the RAM has been known to public by the Japanese patent laid open (unexamined) 43246/1982. The reference numeral 38 denotes non entered data representing the fact that no data is entered and the non entered data is expressed by a minimum value with a negative symbol. When the name of the area 35 of the variables is assigned, all of the item data areas corresponding to the variables are written by the non entered data.

Reference numeral 39 denotes absent data which represents the fact that data is absent in the corresponding portions of the table 1. The absent data is expressed by a maximum value with a plus symbol, which is stored when the data absent key 34 is on.

In the present embodiment, the maximum value and minimum value are used as a non entered data and absent data so as to facilitate the use of various code systems without limitations that the computer employs BASIC language. Besides, in the actual data processing, the maximum value and minimum value are expected to scarcely occur.

TABLE 1

| line | row | | | |
|---|---|---|---|---|
| | T1 Math | T2 English | T3 Science | T4 Japanese |
| Y2 Kato | 30 (P1) 85 | 80 (P2) 63 | 45 (P3) 47 | 93 (P4) 39 |
| Y3 Saito Kenichi | 37 (P9) | 43 | 76 | 68 |
| Y4 Takai | 49 | 83 | 93 | 46 |

TABLE 1-continued

| line | row | | | |
|---|---|---|---|---|
| | T1 Math | T2 English | T3 Science | T4 Japanese |
| Y5 Yokota | 34 | 29 | 49 | 39 (P20) |

The operation of the computer mentioned above will be explained hereinafter.

In order to store the various data shown in the table 1 in the meory area 462, the operator pushes the table key 31 as shown in FIG. 1 first, then the title of the table is entered by the character keys 12. The title data is stored in the table data area.

Subsequently, the input key 27 is operated to instruct to the input of the row items. In turn, the respective row item data 31 such as Mathematics (expressed as Math. in the table 1), English and so on are entered by the character keys 12 and are stored in the memory areas of the RAM 46. Moreover, the input key 27 is operated to instruct to the input of the line items. In turn, the respective line item data 34 such as the names of students Aoki, Kato and so on are entered by the character keys 12 and are stored in the memory area of the RAM 46.

By repeating the operations mentioned above, the row and line title data are stored. Upon pushing the input key 26 again, the subsequent title of the line item can be entered. However, when the line is unnecessary, the second operation of a consecutive two time operation of the input key 26 acts as the instruction of the entry of the numeric data. Thus, upon operation of the cursor keys 15A to 15D, the desired numeric data areas 36 are selected and the numeric data based on the table 1 can be inputted by the numeric keys 13. It is noted that all of the numeric data areas are filled with the non entered data, which is updated by the numeric data entered by the above mentioned numeric key operation. Accordingly, in the case when no numeric data is entered, the non entered data in the respective memory areas remain unchanged.

The statistical operation mode (STAT) is explained hereinafter with an assumption that the table data based on the table 1 are stored in the RAM 46 in a manner as shown in FIG. 3.

Figure 4A:
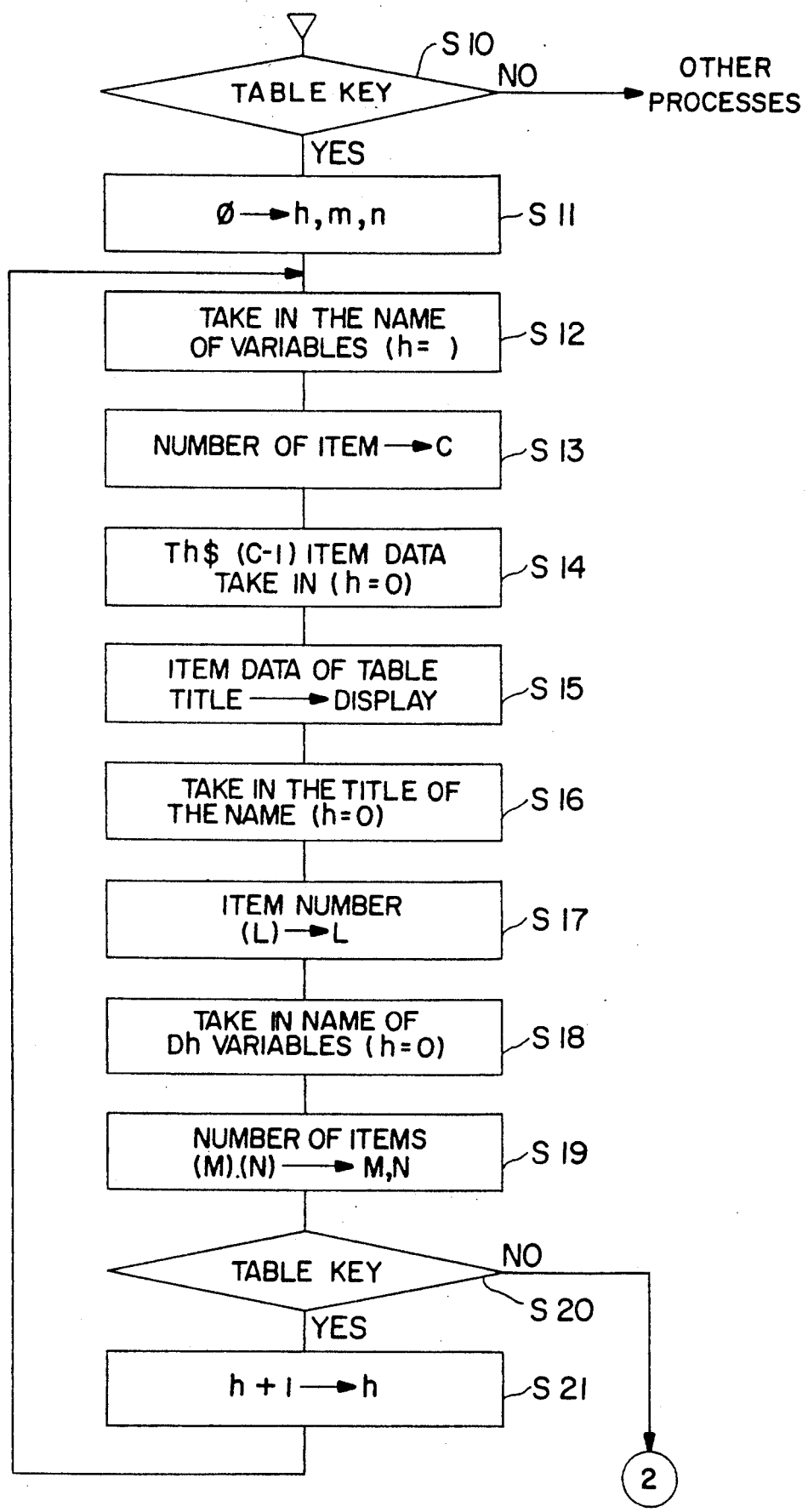

In order to confirm the respective item data stored in the RAM 46, the table key 25 is operated, so that the steps after S11 in FIG. 4A are executed.

In steps S11 to S13, an h counter having the contents which represent the name of the variables of the table, and m and n counters representing the respective item area positions are reset. The area 30 of the variables Th$ or T0$ is taken based on the contents of the h counter and the number of the items (number of the row items) (c) is taken in a C register.

The item data of Th$ (4) 32 or Th$(C−1) is taken and character data representing "a list of the student's record" are decoded in the form of a dot pattern in the CG area 454 of the ROM 45. The decoded character data are transferred to the display buffer 43, then the characters mentioned above are displayed in the display unit 2 through steps S14 and S15.

Subsequently, the variable areas Dh$ or D0$ are taken and the line item number (L) is transferred to an L register. The Dh or D0 variable name area 35 is taken, so that the number of items (M,N) are transferred to the M and N registers in steps S16 and S19.

In the case of accessing another table data, the content of the h counter is increased by 1 by operating the table key 25. Operation of the cursor keys 15A to 15D cause the program to go to step S30 as shown in FIG. 4B.

It should be noted that the data h (herein 0) for discriminating the table data and row item number are stored in the C register and the data item number is stored in the M and N registers.

Figure 4B:
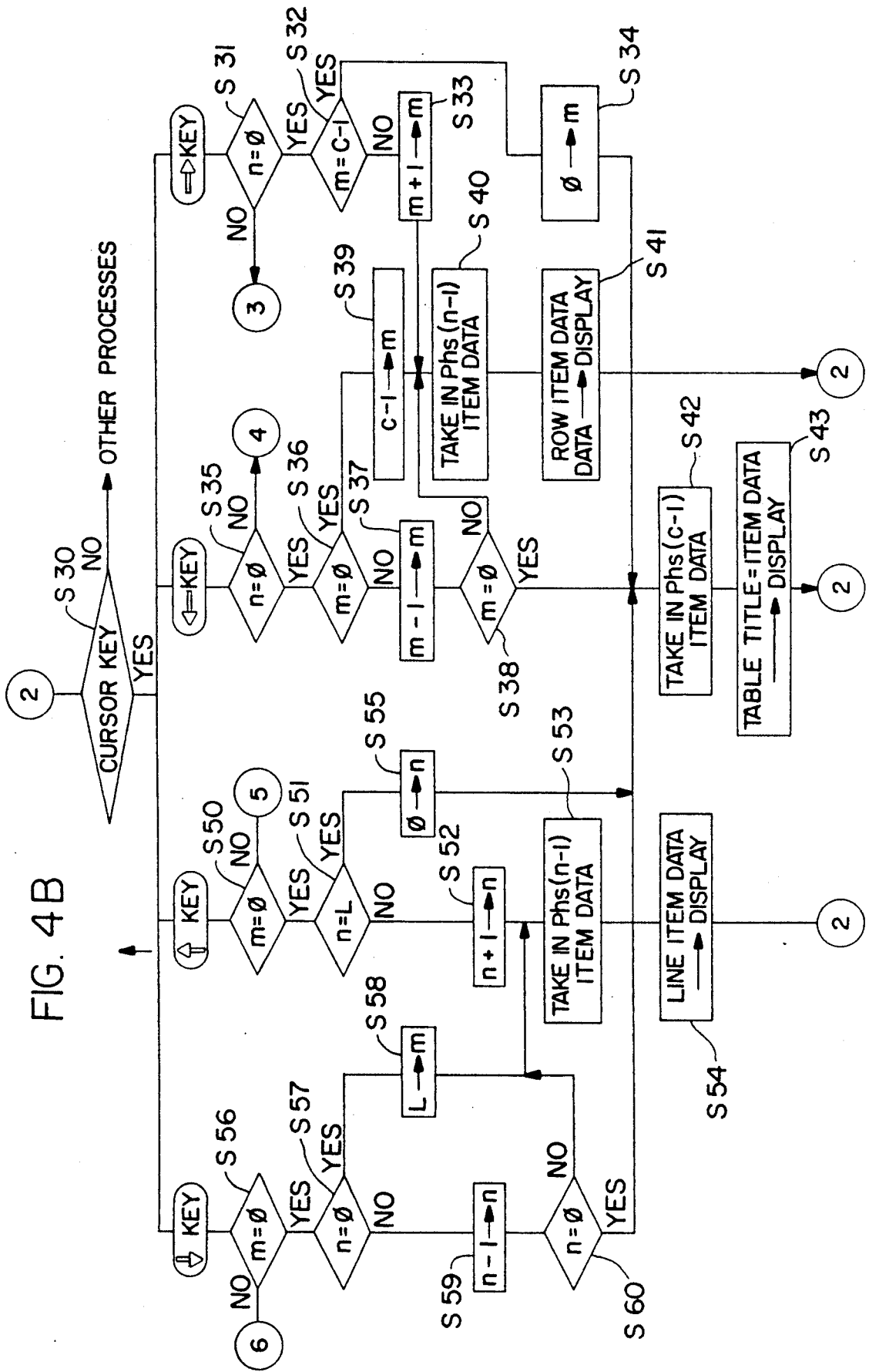

Referring to FIG. 4B, upon operation of the cursor right shift key 15A, the program after step S31 is performed and upon operation of the cursor left shift key 15B, the program after step S35 is performed. Upon operation of the cursor up shift key 15C, the program after step S50 is performed and upon operation of the cursor down shift key 15D, the program after step S56 is performed. In a period of displaying the table title, the contents of the m counter and the n counter are both zero. Under such a situation, when the cursor right shift key 15A is operated, the m counter is increased by 1, the row item data 31 represented by Th$(m-1) is read out, the character strings "row items =item data" are fed to the display unit 42 and are displayed therein.

The operation mentioned above is repeated every time the cursor right shift key 15A is operated. Each of the row item areas 31 are taken in a right direction in FIG. 3 and they are displayed through steps S31 to S33, S40 and S41.

When the contents m of the m counter reach m=C−1 due to the repetitive operation of the cursor right shift key 15A (when the rightmost row item of the table 1 is displayed), the m counter is reset to make the contents of the m counter and n counter 0. The item area 32 is taken out so as to display "table title=item data (list of the student's record)" through steps S31 to S34, S42 and S43.

When the cursor left shift key 15B is operated, the contents of the m counter is made m−1 according to the step after S35. The contents of the row item areas 31 are read out in a left direction (in the left direction in the top part of the table 1) every time the cursor left shift key 15B is operated, and the contents are displayed in the display unit 42 through steps S35 to S38, S40 and S41.

When the cursor left shift key 15B is operated under m=1, Th$(C−1) that is the item data of the table item area 32 is taken so that "title of the table =item data (list of the student's record)" are displayed.

When the cursor left shift key 15B is operated under m=0, the name of the row item of the right end is displayed through steps S35 to S37, S40 and S41 or S35 to S38, S42 and S43.

On the other hand, when the cursor up shift key 15C is operated, the program after step S50 is performed and the contents of the n counter is increased by 1 under m=0 and Dh$(n−1). That is, the respective line item data 34 are displayed every time the cursor up shift key 15C is operated, whereby "line items=item data (Aoki, Kato, and so on)" are displayed.

According to the operation mentioned above, data is read from the area on which the reference numeral 34 is described to the right (downward in the left end portion of the table 1) in steps S50 to S54.

In the case when the displayed line item area is final, (the lowest line in the table 1), and n counter is reset and steps S42 and S43 are performed through steps S50 to S55.

When the cursor down shift key 15D is operated, the line item data are sequentially displayed in a reverse direction to the direction mentioned above through steps S56 to S60.

As mentioned above, when the cursor right shift key 15A or cursor left shift key 15B is operated in the condition of m=0, each row item of the table 1 are sequentially displayed circling in the right direction or left direction in the table 1.

When the cursor up shift key 15C or cursor down shift key 15d are operated in the condition of m=0, each line item shown in the table 1 is sequentially displayed circling in the upward direction or downward direction. When m=0 and n=0, the name of the title of the table is displayed.

In the operation mentioned above, when either of the cursor right shift key 15A or the cursor left shift key 15B is operated in the condition of n≠0 or either of the cursor up shift key 15C or the cursor down shift key 16d is operated in the condition of m=0, the operation goes to the data item area display as shown in FIG. 4C.

It is determined at step 70 whether or not m=H or the rightmost item in the data item area is now displayed. In the case when m does not reach H, the m counter is increased by 1, Th$(m−1) item data (any area in the row items 31) is selected and the selected data is transferred to the B register. If m=1, the row item area 31 in T0$ as shown in FIG. 3 is taken in steps S70, S74 and S75.

Subsequently, the item data Dh$(n−1) is stored in the A register. Assuming n=1, the D0$(0) line item "Aoki" is taken in step S76.

It is determined at step S77 whether the sum of the number of characters in the A register and the number of the characters in the B register is smaller than or equal to a predetermined value l, for example 13. In case when the sum is greater than l, the contents of the A register and the B register are compared in step S78. The trailing one character in the character strings of any one of the register string having a greater number of characters is deleted in either steps S79 or S80. This operation is repeated until the sum of the number of characters stored in the A and B registers (abbreviated as A+B hereinafter) becomes equal or smaller than the value l. When A+B ≦l, the numeric data is taken from the data items area 36 based on the contents of the m counter and n counter. The name of the line item which is stored in the A register and the name of the row item which is stored in the B register, and the numbers of both characters being adjusted as mentioned above are displayed in the display unit 2 with the numeric data in steps S81 and S82.

For example, if the contents of the m counter and n counter equal 1, the character strings of the line item and row item "Aoki: Mathematics=70" is displayed.

The process shown in steps S77 to S80 enables the display of the line item and the row item on one line of the display unit 2 that eliminates a part of the line item and row item so that the sum of the character strings of the row item and line item becomes within the predetermined value l because there is a limit of the number of characters that may be displayed in the one line display unit 2.

Every time the cursor right shift key 15A and the cursor left shift key 15B are operated, the data of the line item and the row item of a predetermined line in the table 1, where the line is determined by the contents of the n counter, can be displayed in the display unit 2 by shifting in the right or left direction. In the case when the cursor right shift key 15A is pressed for displaying from the right end item in the table 1 or the cursor left shift key 15B is pressed for displaying the left end item in the table 1, only the name of the line item can be displayed as shown in FIG. 4B (S73).

Every time the cursor up shift key 15C and the cursor down shift key 15d are operated, the data of the line item and row item of a predetermined row in the table 1, where the row is determined by the contents of the m counter, can be displayed in the display unit 2 by scrolling in an upward or a downward direction. In the case when the cursor up shift key 15C is pressed for displaying from the lowermost item in the table 1 or the cursor down shift key 15d is pressed for displaying the uppermost item in the table 1, only the name of the row item can be displayed as shown in FIG. 4B (S90).

As mentioned above, since the name of the line item and the name of the row item are simultaneously displayed the stored data can be easily confirmed with a small line number display unit.

The various features of the display in the embodiment mentioned above are summarized hereinafter with reference to the table 1.

When the position P1 in the table 1 is indicated on the display area,
"Aoki Mathmatics=30" is displayed.

When the position P2 in the table 1 is indicated,
"Aoki English=80" is displayed.

When the position P20 in the table 1 is indicated,
"Yokota: Japanese=39" is displayed.

As mentioned above, the name of the line item, and the name of the row item are displayed with the numeric and character data corresponding to the indicated names of the line and row items sequentially. Therefore, it can be easily understood what position and what data in the table are presently being displayed.

When the position P9 in the table 1 is indicated, there is displayed "Saito Ken: Mathematics=37". In this case, the sum of the number of the character strings of the names of the line item and row items is limited to a predetermined value, and the characters exceeding the limit are eliminated from the display.

Figure 5:
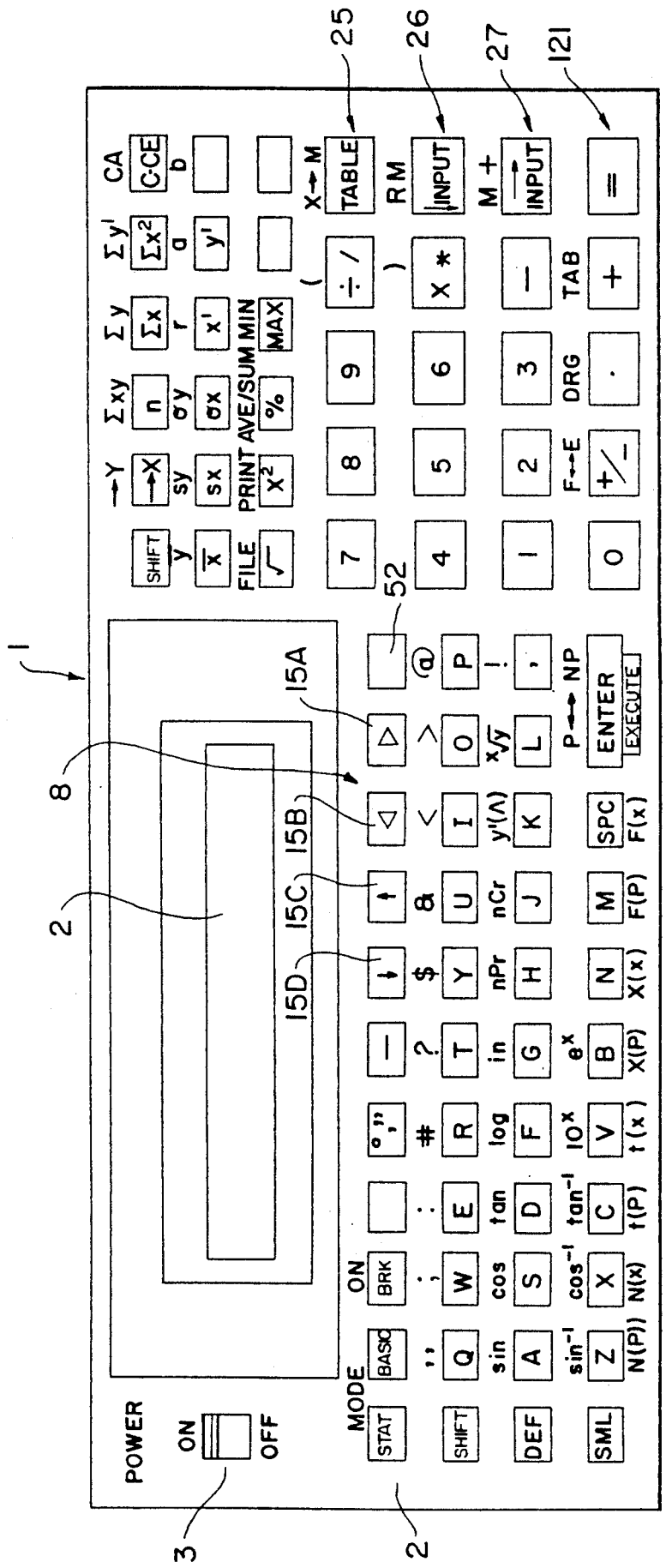
FIG. 5 is a top plan view of another example of a handy type computer in which a data processing device according to an embodiment of the present invention is incorporated.

Referring to FIGS. 5 to 11 which show another embodiment of the present invention, the computer of the keyboard shown in FIG. 5 includes an interchange key 121 for generating a data matrix having a data array corresponding to a transpose of a data matrix.

With reference to FIG. 6, the RAM 46 includes a table area 464 for storing the respective table data, a system area 465 containing an h counter 466 for representing parameters corresponding to the respective table titles used for discriminating the respective tables, an m counter 467 representing parameters for discriminating each line of the table and an n counter 468 representing parameters for discriminating each row of the table. RAM 46 further contains an F register for storing an assembly of flags representing the completion of transposing the data of the lines and rows of each matrix (the flag is referred to as transpose completion flag), an X register acting as a working area for performing the transpose of the matrix and miscellaneous C, M, N, A and B registers.

TABLE 2

|  | T1 Math. | T2 English | T3 Science |
|---|---|---|---|
| Y1 Aoki | 63 | 82 | 73 |
| Y2 Kato | 49 | 35 | 94 |
| Y3 Saito | 75 | 63 | 83 |

TABLE 2-continued

|  | T1 Math. | T2 English | T3 Science |
|---|---|---|---|
| Y4 Tiba | 93 | 46 | 63 |
| Y5 Numata | 24 | 35 | 42 |
| Y6 Hayasi | 38 | 79 | 56 |

In the table area 464 of the RAM 46, there is set a definition area 200 (see FIG. 3) in which a character string function Th$ (C) of every table title and every row item name and row item number (actually row item number plus 1) are assigned from the leading address.

A row item name area 201 to 205 in the able area 464 is defined wherein the respective row item names as shown in the table 2 are stored in such a manner as $$T0\ \$\ (0) = \text{"mathematics"} \tag{1}$$

using the count value C of the C register as a parameter.

Subsequently, another definition are a 210 is set for storing the string function Dh$ (L) assigned for the line item names. Then the line item areas 211, 212 and 213 are set using the count value L as a parameter, so that the line item name $$D0\$\ (0) = \text{Aoki} \tag{2}$$

for example, can be stored.

Subsequently, there is set a further definition area 214 which is defined for the numeric value function Dh (m,n) assigned to the input data corresponding to the points of the students in the table 2. Then the data storage areas 215 and 216, and the input data are stored in such a manner as $$D0\ (0,0) = 30 \tag{3}$$

The data is automatically assigned in the table area 464 for every input process. The data can also be assigned according to the variable order of the BASIC language. The data can be accessed by calculating the address value of the data according to the item number stored in the definition areas 200, 220, 210...and so on along with the name of variables.

Stored in the table data area 464 are data that are assigned in the area preseumed by the maximum length L0 in the row direction of the table which is defined in the definition are 210 and the maximum length C0 in the line direction when no data is inputted to computer 1. All of the data mentioned above are stored in the table data area 464.

Figure 7A:
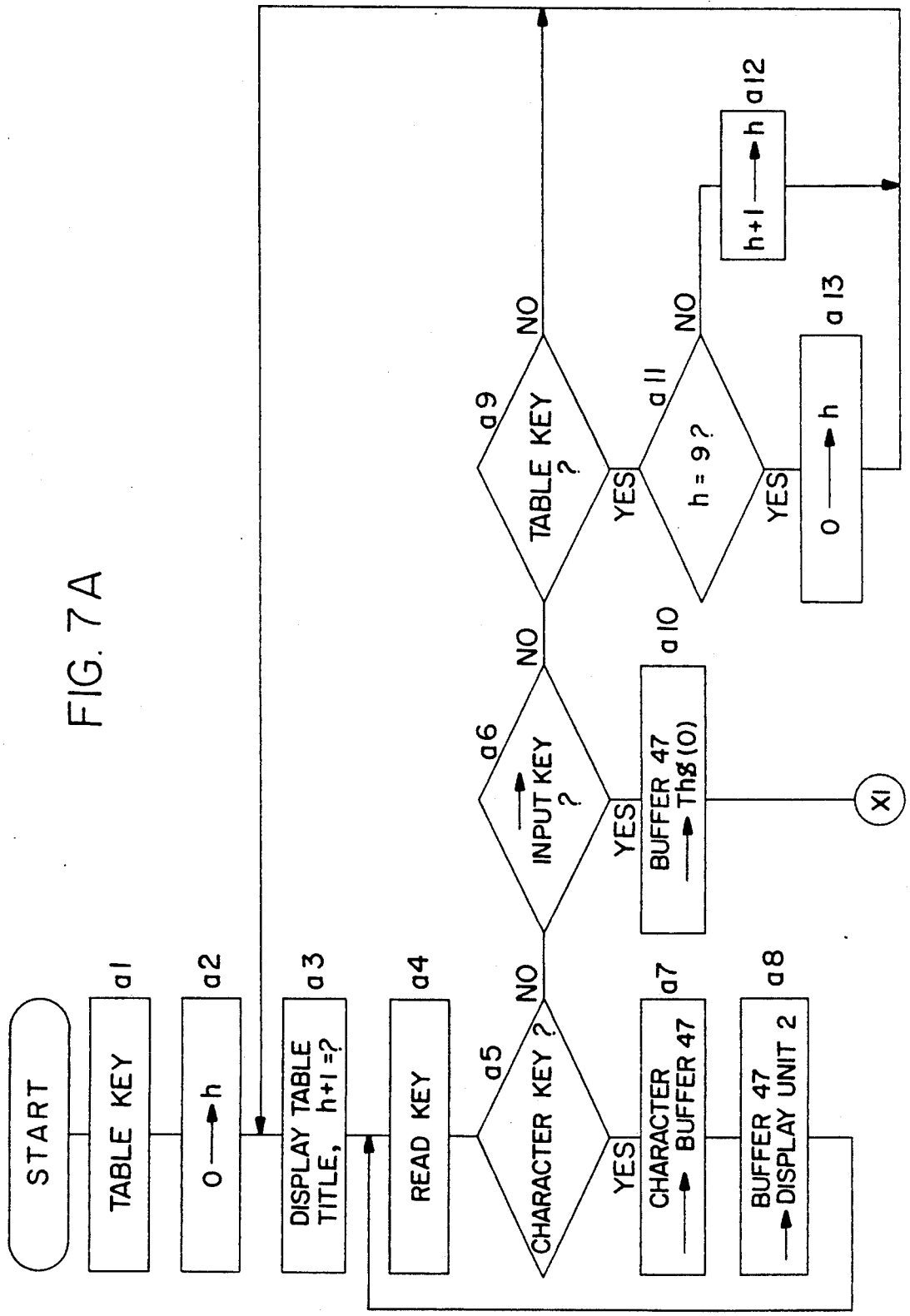
FIGS. 7A and 7B are flow charts showing an operation of the data processing device shown in FIG. 5 and FIG. 6.
Figure 7B:
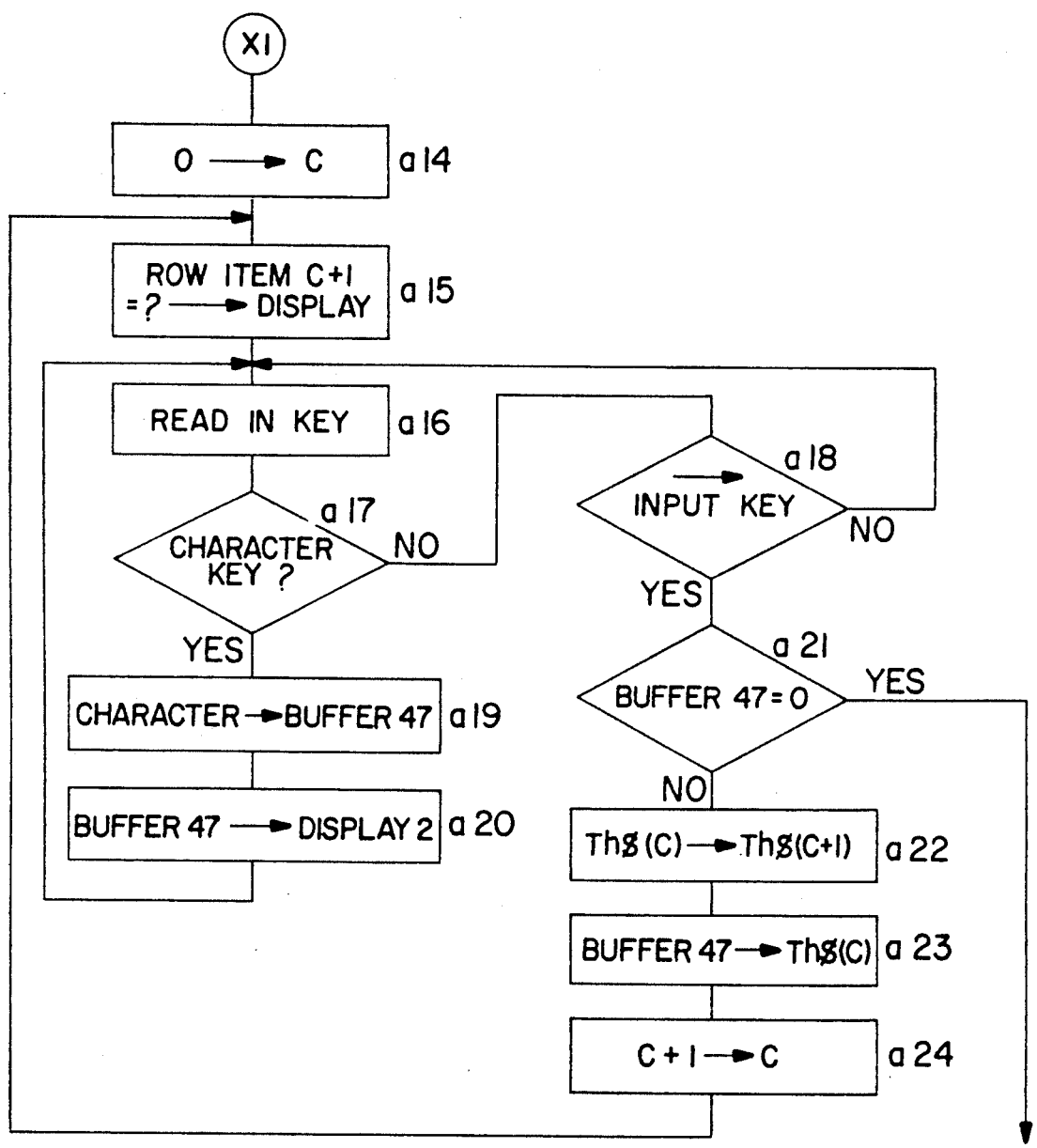

The procedure for inputting the various data for making the desired table will be explained with reference to FIGS. 7A and 7B. In the step a1, the table key 25 is operated then the h counter for storing the number of each table is reset to 0 in step a2. Subsequently, the CPU 40 acts to store the data representing "table title"; h+1; "=?"

in the display buffer 43 in step a3 for displaying the data in the display unit 2.

Key input data entered by the operation of the keys in the key board are read at step a4. It is determined at step a5 whether or not the operated key belongs to the character input key group 12 such as alphabet and kana. When the determination is no, the program goes to step a6. When the determination is "yes", the program goes to step a7 to take in the entered character code in the key input buffer 47. The character code is decoded to a character pattern code using the CG area 454 and the decoded character pattern code is fed to the display control unit 42. Thereby, the character in the display unit is displayed at step a8. Thereafter, the program goes to step a4, repeating the operation of a4 to a8. By the operation mentioned above, the entered table title such as "student's record" is stored in the key input buffer 47 and the table title can be displayed in the display unit 2. When the determination is "no" at step a5, the program goes to step a6 wherein it is determined whether or not the operated key is the row input key 27. When the determination is "no", the program goes to step a10 where the contents of the key input buffer 47 stored at step a7 is stored in the area of the string function Th$(C). On the other hand, it is determined at step a9 whether or not the table key 25 is operated. When the determination at step a9 is "no", the program goes to step a3. When the determination at step a9 is yes, the program goes to step a11 and determines whether or not the count value h of the h counter is a predetermined value T, for example 9. The predetermined value T represents the maximum available number of the tables in the computer 1. In the example mentioned above, nine tables can be stored in the computer 1. The value T may be more or less than 9.

When the determination at step a11 is no, which means that one or more tables can be entered in the computer 1, the program goes to step a12 in which the contents of the h counter is increased by 1 and then the program goes to the step a3. When the determination is yes at step a11, which means that a further table can not be entered, the program goes to step a13 to make the contents of the h counter "0" and then the program goes to step a3 to display the title of the first table.

Following step a10 is step a14 for entering the line item name. In step a14, the content C of the C register which represents the row item number is initialized to 0. The row item name is displayed in step a15 in the same manner as the format of the table title in step a3. Subsequently, the data inputted by the key board 44 is read in step a16.

In step a17, it is determined whether or not the character key is operated. When the determination is "no", the program goes to step a18. On the other hand, when the determination is "yes", the program goes to step a20 wherein the inputted character key code is stored in the key input buffer 47 in the same manner as mentioned in steps a7 and a8. Thereby, the characters in the display unit 2, are displayed then the program goes to step a16.

When the determination is "no" at step a17, it is determined at step a18 whether or not the row input key 27 is operated. In the case when the determination is no, the program goes to step a16 to repeat the operation mentioned above. In the case when the determination is yes, it is determined at step a20 whether or not the contents of the key input buffer 47 is empty. In the case when the determination is no, the program goes to step a22, and then the contents of the string function Th$(C) is written in the string function Th$(C+1). Thereafter, at step a23, the present contents of the key input buffer 47 is assigned and stored in the string function Th$(C). Thereafter, the content C of the C register is increased by 1 at step a24 and the program goes to step a15.

Summing up the processes in steps a22 to a24, every time the row item name is entered, each table title stored in the string function areas is sequentially transferred in a direction so that the addresses of the string function areas increase and the newest input row item name is assigned to the string function area Th$(0) corresponding to the content C=0 in the C register.

Figure 8:
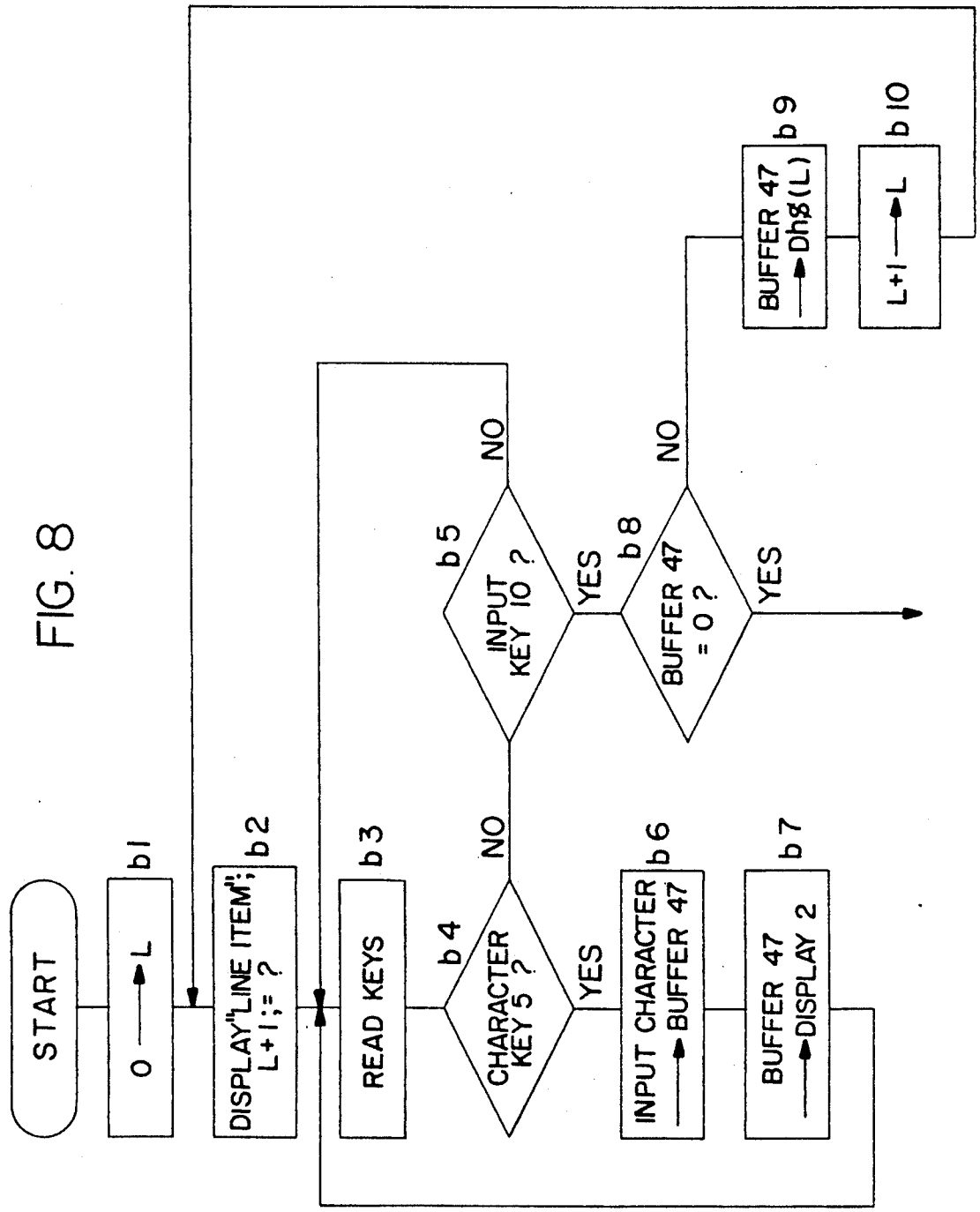

In the case when the row input key 27 is operated without operation of any character keys, the determination at step a21 is yes. This shows that the data input operation of the table presently being made has been completed. Subsequently, the program goes to the steps to enter the line item name as shown in FIG. 8.

In step b1, the C register is initialized to 0, and then the program goes to step b2 to display the character strings "line item"; L; "=?" in the display unit 2.

The key information inputted are read at step b3. Subsequently, it is determined at step b4 whether or not any character key is operated. In the case when the determination at step b4 is no, the program goes to step b5 in which it is determined whether or not the line input key 26 is operated. In the case when neither the character key 12 nor the line input key 26 is operated, the program goes to step b3. In the case when the judgment is yes at step b4, the program goes to steps b6 and b7 wherein the input character key information is stored in the key input buffer 47 and is displayed in the display unit 2.

Figure 9A:
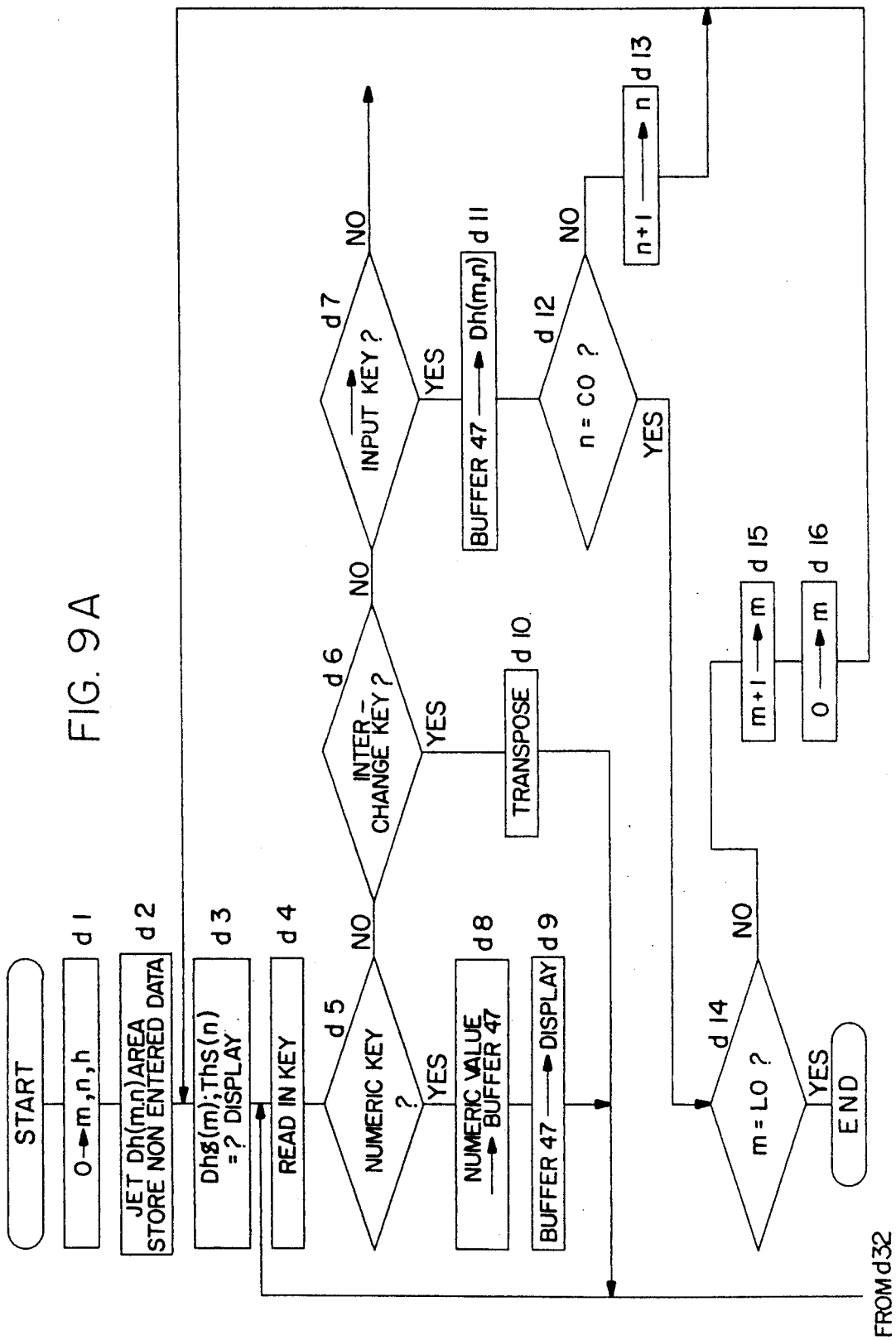

In the case when the input of the characters of the line item name of one line is completed, the results of the determination at steps b4 and b5 are no and yes, and then the program goes to step b8, wherein it is determined whether or not the contents in the key input buffer 47 is 0. In the case when the determination is yes, which means that the line item name has been completed, the program goes to the process as shown in FIGS. 9A and 9B. In the case when the determination at step b8 is no, the program goes to step b9. The data in the key input buffer 47 is stored in the string function Dh$(L), and then the count value (L) is increased by 1 at step b10. Thereafter, the program goes to step b2 and inquires whether or not there is a further input of the character of the line item name by the display unit 2. In the case when the input of the line item name has been completed, the operator pushes the line input key 26 again, and the program goes to step b8 through steps b4 and b5. It is detected that the contents of the key input buffer 47 is empty at step b8, so that the program goes to the process as shown in FIGS. 9(a) and 9(b) for processing the input numeric data of the contents of the table such as the points of the students in the table 1. In step d1, the contents of the m counter, which represents the position in the table of the row direction, and the contents of the n counter, which represents the position in the table of the line direction, are respectively initialized to 0. Also, the contents of the h counter which store the table number is initialized to 0.

In step d2, the memory capacity of L0×C0 is preliminarily assigned for the numeric function Dh$(m,n). In the above step, L0 means the maximum number of data in the table of the line direction and C0 means the maximum number of data in the table of the row direction, and the non entered number is stored in the respective memory areas.

The following contents representing the string functions Th$(C) and Dh$(L) of the row item name and the line item name are displayed in the display unit 2 at step d3

Dh$(m);Th$(n); "=?"        (A)

Subsequently, the key input is read at step d4.

The steps d5, d6, and d7 are provided for discriminating that the entered characters are coming from the numeric key group 13, the interchanging key 121 or the row input key 27. When the determination is "yes" at step d5, the inputted numeric data is stored in the input buffer 47 and is displayed in the display unit 2 at step d9. When the input of the numeric data is completed, the inputted numeric characters such as 69 are displayed in the first line and first row of the table display unit 2.

When the determination is "no" at step d5 and "yes" at step d6, the program goes to step d10 to perform a matrix transposing process which will be explained later. When the input of the data of one row is completed and there is an inquiry for the subsequent row, the determination at step d6 is "no" and is "yes" at step d7. The program goes to step d11 to transfer the contents of the key input buffer to the data function Dh$(m,n) (now m and n are 0). Subsequently, it is determined at step d12 whether or not the number of the rows which are filled with the input data becomes the maximum row number C0. When the data have not been filled up to the maximum row, the determination at step d12 is "no" and the program goes to step d13 to increase the contents of the row number in the n counter by 1 and returns to step d3.

In the case when the data has been filled up to the maximum row, the determination at step d12 is made "yes" and the program goes to step d14. At step d14 it is determined whether or not the number m of the lines to which the data are presently being inputted is equal to the maximum number L0 decided in step d2. If m equals L0, the input is completed. On the other hand, if m does not reach L0, the program goes to step d15 to increase the contents of the m counter by 1 so as to perform the process for the next line of the table. Subsequently, the counter is made 0 in step d16 to wait for the input data of the first row of the next line of the table and the program goes to step d3.

In the case when the determination at step d7 is "no", which means any key other than the data input is operated, the program goes to steps d17, d18, d19 and d20 sequentially wherein it is determined whether any of the cursor keys 15A to 15D are operated. In the case when the key which is now operated is not the cursor keys, the program goes to step d4.

In the case when one of the cursor keys such as the right cursor key is operated, the determination at step d17 is made "yes" and the program goes to step d21 so as to increase the contents of the n counter by 1 to displace the cursor (not shown) in the display unit. Similar opertions may be made to the cursor keys 15B to 15D for performing steps d18 and d22, d19 and d23 and d20 and d23.

After the processing of steps d1 to d24, the program goes to step d25, wherein it is determined whether or not the contents of the n counter reaches the value (C0+1). This is the process for determining whether or not the cursor is out of the table area beyond the right end edge of the table that is displayed in the display unit 2 in the line direction. In the case when the determination is "yes" at step d25, the content of the n counter is decreased by 1 at step d26 so that the cursor is located in the range of the table, and then the program goes to step d27. In the case when the determination is "no" at step d25, the program goes to step d27 directly.

It is determined at step d27 whether or not the contents of the m counter exceeds L0+1 for determining whether or not the cursor is out of the table area beyond the top end edge of the table area in the row direction on the display unit 2. In the case when the cursor is out of the table area, the determination becomes "yes" and the program goes to step d28 wherein the contents of the m counter is decreased by 1. Thereby, the cursor is displayed in the table area of the display unit 2.

It is determined at step d29 whether or not the contents of the n counter is negative so as to determine whether or not the cursor is out of the table area beyond the left end line of the table displayed on the display unit 2. In the case when the determination at step d29 is "yes", the contents of the n counter is made 0 at step d30 and the program goes to step d31. When the determination at step d29 is "no", the program goes to step d31 directly.

It is determined at step d31 whether or not the contents of the m counter is negative so as to determine whether or not the cursor is out of the table area beyond the top end line of the table that is displayed on the display unit 2. In the case when the determination at step d31 is "yes", the contents of the m counter is made 0 at step d32 and the program goes to step d4. When the determiation at step d31 is "no", the program goes to step d4 directly.

By the above mentioned processing, the table title, the row item name, the line item name and the data may be entered to complete the desired table such as the table 2 of the student examination records.

Referring to FIG. 10 which shows a way of transposing the row of the matrix of the table, the data function Dh$ (m,n) as already mentioned, is a two variable function having the count values (m,n). In this table, the respective matrix elements are given sequential numbers of 1, 2, 3, 4, ....beginning from the leftmost element on the top line of the matrix toward the right end. The sequential numbers can be represented by $$Dh(a) = Dh(m,n) \qquad (4)$$

wherein $a = (m-1) C0 + n$.

By definition mentioned above, the data function Dh (m, n) corresponds to one variable function Dh(a) in a one to one relation. Using the one variable function Dh(a), the table 2 can be expressed as in the table 3.

TABLE 3

| Dh (1)  | Dh (2)  | Dh (3)  |
| Dh (4)  | Dh (5)  | Dh (6)  |
| Dh (7)  | Dh (8)  | Dh (9)  |
| Dh (10) | Dh (11) | Dh (12) |
| Dh (13) | Dh (14) | Dh (15) |
| Dh (16) | Dh (17) | Dh (18) |

The purpose of the process shown in FIG. 10 is to transpose the matrix as shown in the table 3 into the matrix as shown in the table 4.

TABLE 4

| 1      | 2      | 3      | 4       | 5       | 6       | 7      | 8      | 9      | 10      | 11      |
|--------|--------|--------|---------|---------|---------|--------|--------|--------|---------|---------|
| Dh (1) | Dh (4) | Dh (7) | Dh (10) | Dh (13) | Dh (16) | Dh (2) | Dh (5) | Dh (8) | Dh (11) | Dh (14) |
|        |        |        |         | 12      | 12      | 14     | 15     | 16     | 17      | 18      |
|        |        |        |         | Dh (17) | Dh (3)  | Dh (6) | Dh (9) | Dh (12) | Dh (15) | Dh (18) |

When the transposing key 121 is operated in step e1, the A counter is set to 1 at step e2. Subsequently, the numeric value data, such as 63 assigned to Dh(1), is stored in the X register at step e3.

The data function Dh(a) contains the numeric data shown in the table 2 and a flag (referred to as the transposing completion flag and abbreviated as TCF in FIG. 10) which is 0 during the transposing of the matrix and becomes 1 when the transposing of the matrix is completed. In the period immediately after the transposing of the matrix starts, the respective transposing completion flags with respect to all of the count values a are 0. The contents of the transposing completion flags and the numeric data of the table 2 are stored in the X register at step e3.

In step e4, it is determined whether or not the transposing completion flag is 1. In the case when the determination is "no" the program goes to step e5 wherein the transposing completion flag in the data function Dh(1) is set to 1.

In order to transpose the matrix, the count value a (1, 2, 3, 18 in this example) representing the sequential number of the elements in the transposed matrix according to the following equation $$a' = \{(a-1) - [a-1/C\phi]C\phi\}L\phi + \{[a-1/C\phi]-1\} \qquad (5)$$

The relation between the numbers a and a' is shown in the table 5.

TABLE 5

| 1 - 1.   | 2 - 7.   | 3 - 13. | 4 - 2.   | 5 - 8.   |
| 6 - 14.  | 7 - 3.   | 8 - 9.  | 9 - 15.  | 10 - 4.  |
| 11 - 10. | 12 - 18. | 13 - 5. | 14 - 11. | 15 - 17. |

Under the condition that the number a is set to 1 at step e2, a'=1 is calculated according to the equation 5 or table 5 at step e7. Since the transposing completion date flag of Dh (a' (=1)) is already set at step e5, the determination at step e8 is made to be "yes" and the program goes to step e9 and the element Dh (1) is fixed at the position of a'=1 in the table 4.

In step e9, the count value a is increased by 1 and it is determined at step e10 whether or not the value a exceeds the maximum number 18 of the element of the table. In this example, the value a has not yet exceeded 18 and the determination is "no", and the program goes to step e3, whereby the data of Dh (2) is taken in the X register and the transposing completion flag of Dh (2) is set to 1 in step e5. In a similar manner as mentioned above, when a=5 for example, a'=8 can be calculated according to the equation 5 and the table 5. In the determination for the transposing completion flag for the data function Dh(a'=(8)) in step e8, if it is determined to be "no", the program goes to step d11 and sets the transposing completion flag for Dh(8) to 1.

In step e12, data of the data function Dh (a'=8) including the transposing completion flag thereof and data of the data function Dh(2) stored in the x register as well as the transposing completion flag thereof are interchanged. Accordingly, the data function Dh(a' (=7)) is given by the data of Dh(2). Namely the data function Dh (2) is assigned at the position of a'=7 of the destination matrix in the table 4. The X register stores the data of the data function Dh(7).

Thereafter, the program goes to step e7 to provide the data function Dh(a'=(3)) in such a manner that the data function Dh(7) in the table 4 is situated at the position of a'=3. Subsequently, steps e7, e8, e11 and e12 are performed and 4-2 process is performed wherein a'=2 is calculated in step e7. During this period of time, only the data function Dh(18) has not been transposed.

It is determined at step e8 whether or not the transposing completion flag of the data function Dh(a" (=2)) is 1. Since the transposing completion flag of Dh(1) has been already made 1 in the process of a=1, the result of the determination at step e8 is yes and the program goes to step e9 in which the contents of the counter becomes a=3. In turn, the program goes to step e12 in which the result of the judgment is "no" and the program goes to step e3.

At step e3, the contents of the data function Dh(3) are transferred to the X register 31 with the content 1 of the transposing completion flag of the data function Dh(3). The determination at step e4 is "yes" and the program goes to step e9. The process consisting of steps e9, e10, e3 and e4 is repeatedly performed and the count value a is increased by 1 for every process. When the contents of the count value a reaches 19, the determination at step e10 is "yes" and the program goes to step e13 wherein all of the transposing completion flags are reset to 0. Whereby, the transposing of the matrix of the source table 3 to the destination table 4 is completed.

As mentioned above, the transposing of the matrix can be performed using only the program as shown in FIG. 10 and the X register. As a result, the operation of the transposing of the matrix can be easily completed by using a memory of small capacity.

Figure 11:
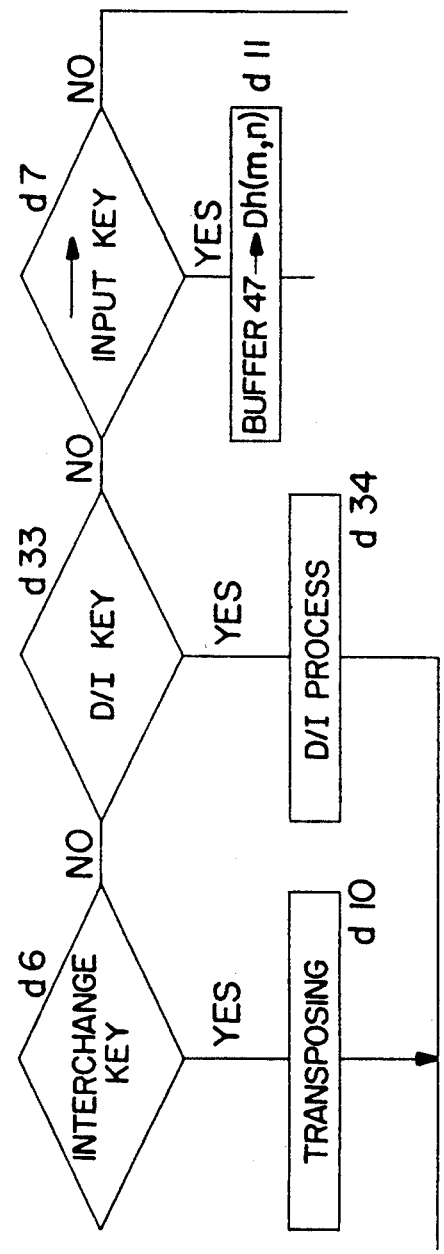

FIG. 11 shows a modification of the device mentioned above in which steps d33 and d34 are added between steps d6 and d7 in the process as shown in FIG. 10 for enabling insertion and deletion of the lines or rows.

In the case when the deletion/insertion key 52 (abbreviated as D/I key in FIGS. 5 and 11) is not operated, the program goes to step d7 to perform the same operation as mentioned with reference to FIG. 10.

In the case when the D/I key is operated, the determination at step d33 is "yes" and the program goes to step d34 for insertion or deletion of the data in the matrix of the table.

Figure 12:
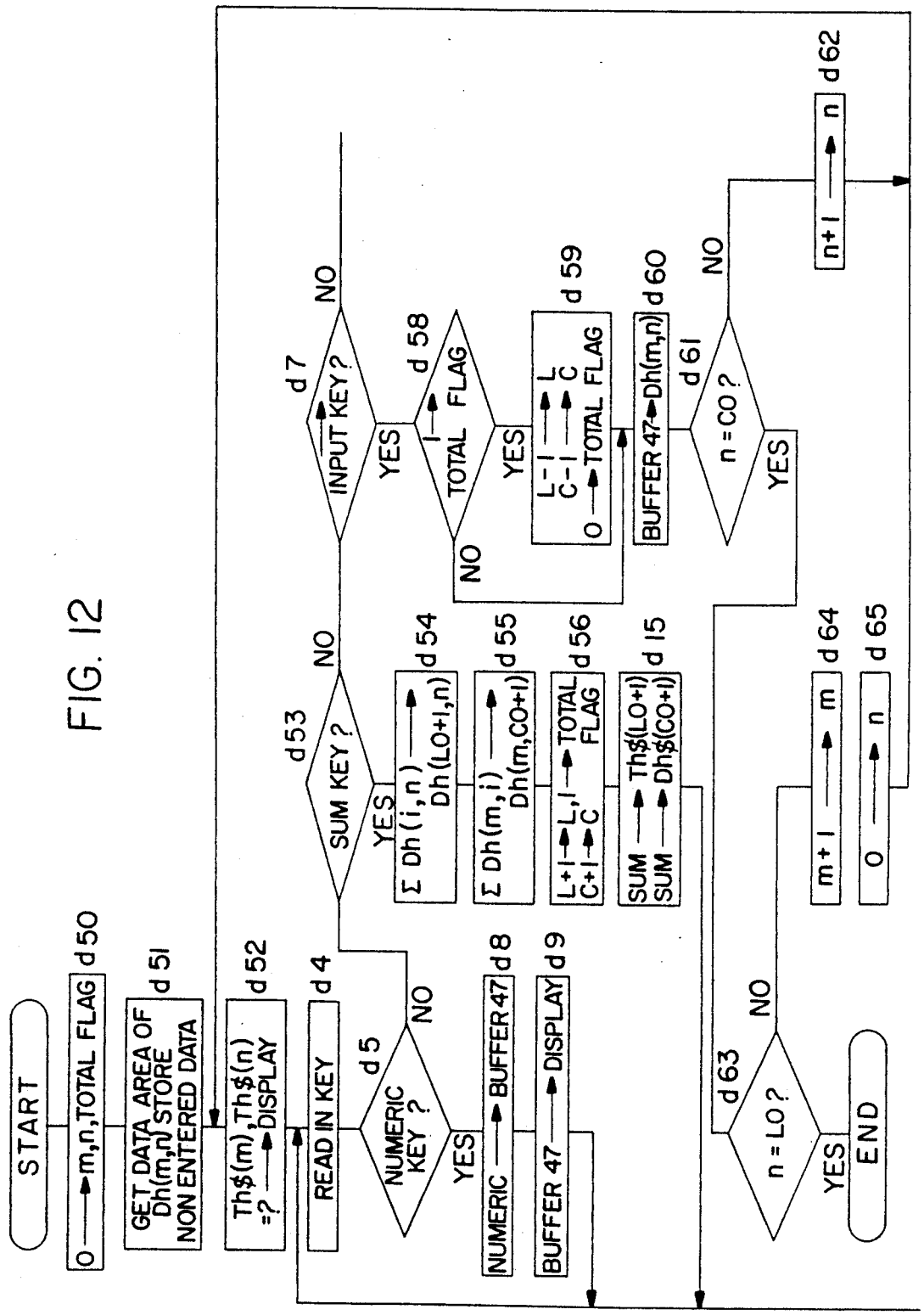

A way of inputting the numeric data for the respective elements in the matrix of the table, such as student points in the tables 1 or 2, as shown in FIG. 12. In FIG. 12, like processes in FIG. 9A are shown by like step numbers and the details thereof are omitted.

Referring to FIG. 12, the contents of the m counter, the n counter and the n register are respectively reset to 0 at step d50. Subsequently at step d2, the area of the numeric function Dh (m,n) of the data areas as shown in FIG. 3 is preliminarily accepted up to such an extent of L0×C0 and the non input data are stored therein.

As to the string functions Th$(C) and Dh$(L0

$$Dh\$(m); Th\$(n); = ?\qquad (B)$$

are displayed in the display unit 1 at step d52. The key information inputted by the key input unit is read at step d4.

It is determined at steps d5, d53 and d7 whether the inputted key information comes from the numeric key group 13, the total key (SUM/%) or the line input key 27. In the case when the total key is operated, the program goes to step d54 from d43 and calculates the sum of the numeric values of the respective items in the row direction $$\sum_{i=0}^{L0} Dh(i,n) \rightarrow Dh(L0 + 1, n) \ (n = 1, 2, 3, C0) \qquad (6)$$

and the resultant data is set.

In step d55, the sum of the numeric values of the line direction is calculated by equation (7) and the result thereof is displayed.

$$\sum_{i=0}^{C0} Dh(m,i) \rightarrow Dh(m, C0 + 1) \ (M = 1, 2, 3, L0).$$

The count values L and C are respectively incremented by 1 and the total flag is set to 1 at step d56.

In step d57, the character strings "total" is stored in the respective string functions Th$(L0+1) and Dh$(C0+1). The display unit 2 displays the result of the sum as shown in the table 6.

TABLE 6

|  | Math. | Japanese | Science | Total |
|---|---|---|---|---|
| Aoki | 63 | 82 | 73 | 218 |
| Kato | 49 | 35 | 94 | 178 |
| Saito | 75 | 63 | 83 | 221 |
| Tiba | 93 | 46 | 63 | 202 |
| Numata | 24 | 35 | 42 | 101 |
| Hayasi | 38 | 79 | 56 | 173 |
| Yokoi | 63 | 95 | 74 | 232 |
| Total | 405 | 435 | 485 | 1325 |

In the case when the table has the total values as shown in the table 8 and the line input key 27 is operated so as to correct one or more of the elements in the table, the result of the determination at step d7 is made to be "yes", and the program goes to step d58. Wherein it is determined whether or not the value of the total flag is 1. In this case, the determination is "yes" and the program goes to step d59.

In step d59, the contents of the L counter for the line item and the C counter for the row item are decremented by 1 respectively, and the total flag is made 0. Thereafter, the contents of the key input buffer 47, which is empty, is transferred to the data function Dh(m, n) for storing respective total values at step d60. The contents of the data function Dh(m, n) are deleted and the program goes to step d52 through steps d61 and d62. Whereby, the display of the total value at the designated part can be erased.

It is determined at step d61 whether or not the row number of the table to which the data is inputted exceeds the maximum line value C0 and checks whether the data are inputted in all of the row items with respect to the given line. In the case when the determination is "no", the subsequent row input is enabled, the count value n is increased by 1 at step d62, and the program goes to step 52.

In the case when the determination at step d61 is "yes", the data input of all row items of the given line is completed, and the program goes to step d63. Wherein, it is determined whether or not the contents m of the counter representing the line number to which the data is presently inputted is equal to the maximum line number L0. In the case when the contents m are equal to L0, the input process is completed. If the contents m are not L0, the input in the rows of the following line is enabled and the count value m is increased by 1 at step d64 for initializing the contents n to 0 at step d65 to receive the data for the first new line. Thereafter, the program goes to the step d3.

Figure 13:
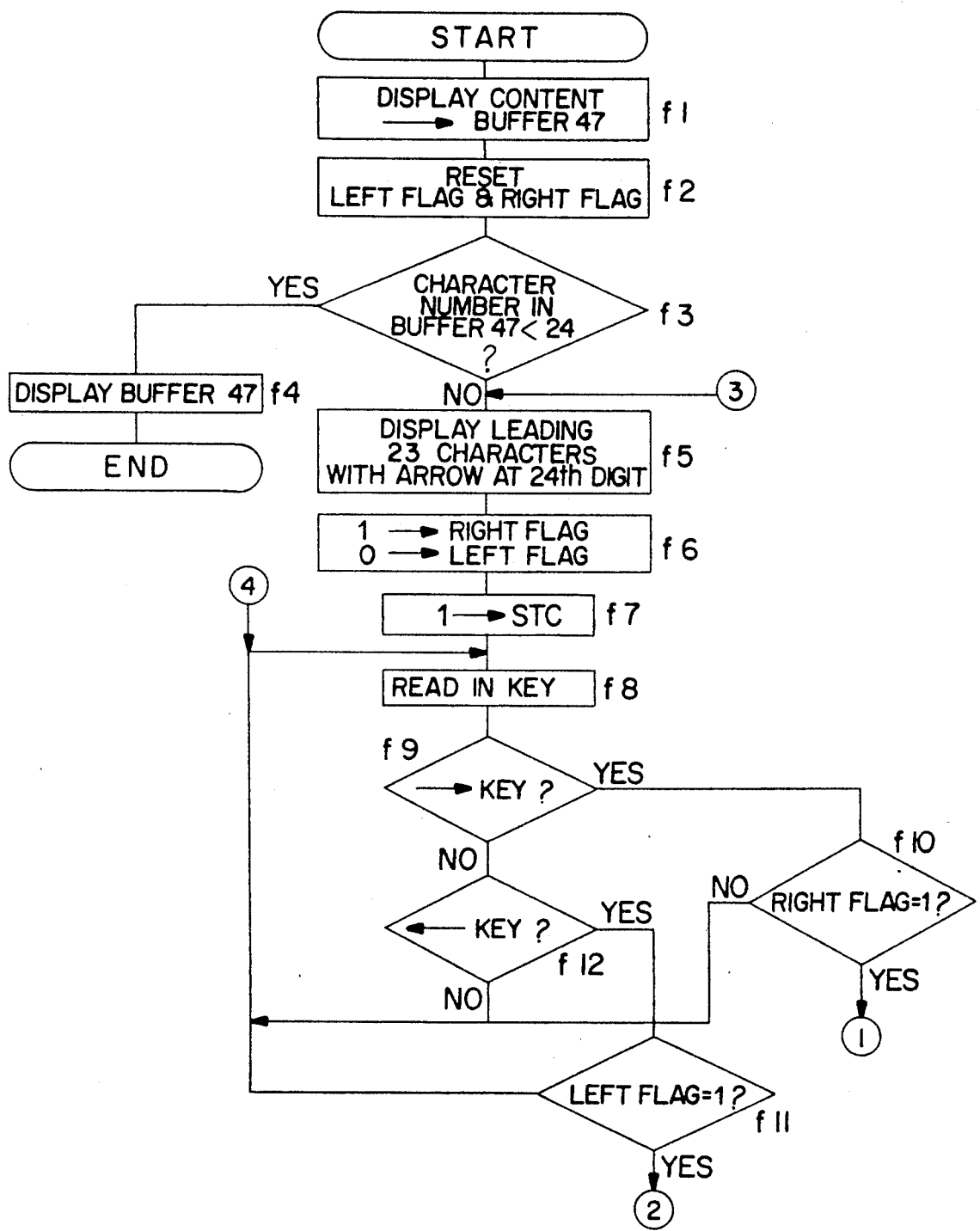
FIGS. 13 and 14 are flow charts showing an example of controlling the data display in the data processing device according to an embodiment of the present invention.
Figure 14:
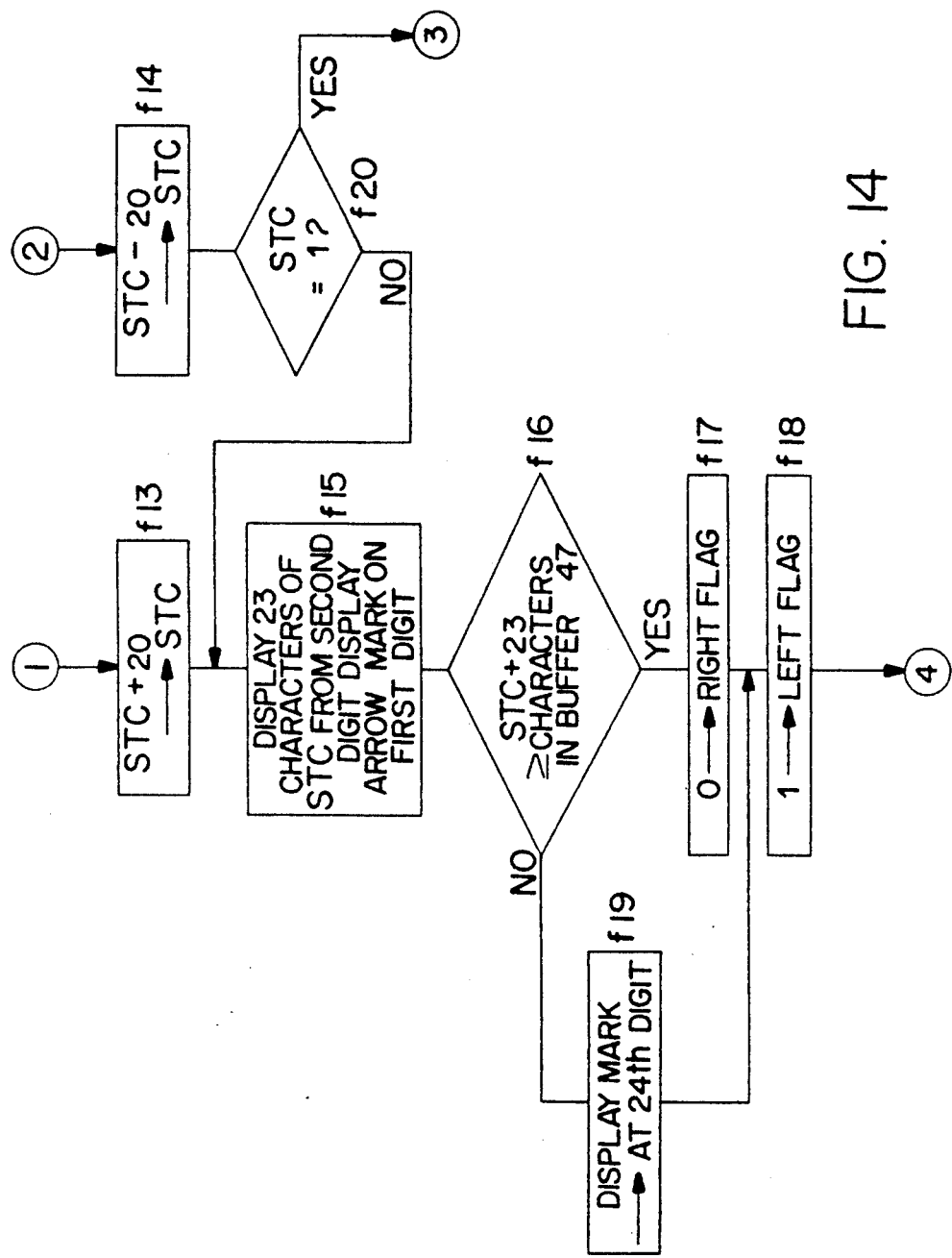

FIGS. 13 and 14 show a display process, in which the information inputted from the key board of the computer 1 is transferred to the key input buffer 47 at step f1. A right direction flag and a left direction flag in the system area 463 are reset to 0 at step f2. It is determined at step f3 whether or not the number of characters to be displayed exceeds the maximum digits of the display unit 2. In the present example, the maximum digits are 24. In the case when the number of characters to be displayed is less than 24, the program goes to step f4 so that the inputted information stored in the key input buffer 47 is displayed in the display unit 2 and the display process ends.

In the case when the number of the characters to be displayed is more than 25, the determination at step f3 is "no" and the program goes to step f5. Wherein, the leading 23 characters stored in the key input buffer 47 are displayed in the display unit 2 with the 24th digit of the display unit 2 displayed by a right direction arrow mark →so that the operator knows the fact that there are one or more characters to be displayed in the display unit 2 other than the presently displayed characters. Then, the right direction flag is set to 1 at step f6 with the left direction flag reset to 0. A pointer CHR indicates the digit position of the character strings stored in the key input buffer 47 to be displayed at the leftmost end position of the display unit 2 and is set to 1 at step f7.

In step f8, the information of one or more keys inputted by the keyboard is read in. Subsequently it is determined at step f9 whether or not the key now operated is a right direction cursor key 15A. In the case when the operated key is a right direction cursor key 15A, the determination at step f9 is "yes" and the program goes to step f10 for detecting whether or not the right direction flag is 1. When the determination is "yes" at step f10, the program goes to step f11. In the case when the determination at step f10 is "no", the number of characters which are displayed in the display unit 2 is less than the maximum digit of the display unit 2 which causes the cursor to be moved in the right direction by one digit, and the program goes to step f8. In the case when the determination at step f8 is "no", the program goes to step f12 to determine whether or not the operated key is a cursor left shift key 15B. In the case when the determination at step f12 is "no", the program goes to step f8. In the case when the determination at step f12 is "yes", the program goes to step f11 and it is determined whether or not the left direction flag is 1. In the case when the determination at step f11 is "yes", the program goes to step f14. In the case when the determination at step f14 is "no", the cursor is moved left by one character and the program goes to step f8. In step f13, the data of 23 characters can be displayed in the display unit 2 with the mark displayed at the 24th character position of the display unit 2. Also, in this case, the cursor right shift key 15A is in the depressed condition. Under such a state, the value of the sum of the contents of the pointer STC and 20 are made to have new contents for the pointer STC. In step f15, a suitable number of characters, such as 23 characters, stored in the key input buffer 47 and following the digit indicated by the pointer STC are displayed from the second leftmost digit in the display unit 2. The first digit or the leftmost digit of the display unit 2 displays the mark.

Subsequently, it is determined at step f16 whether or not the sum of the number indicated by the pointer STC and 23 exceeds the total number of the characters stored in the key input buffer 47. This determines whether or not all the character strings stored in the key input buffer 47 have been displayed in the display unit 2. In the case when the determination at step f16 is "yes", the program goes to step f17 and resets the right direction flag 0. Subsequently, the left direction flag is set to 1 at step f18. Thereafter, the program goes to step f8 and waits for a succeeding key input.

In the case when characters which have not yet been displayed in the key input buffer 47 still remain, the determination at step f16 becomes "no", and the program goes to step f19 to display the mark →at the 24th position of the display unit 2. Thereafter, the program goes to step f18.

When the left cursor key 15B is inputted, the contents of the pointer STC is decreased by 20 and the result of the decrement becomes the start position of the display. It is determined at step f20 whether or not the contents of the pointer STC is 1 and determines whether or not the pointer STC indicates the character situated in the first digit in the key input buffer 47. In the case when the determiation at step f20 is "yes", the program goes to step f5 to display the character strings stored in the key input buffer 47 from the first digit to 23rd digit with the rightmost end digit of the display unit 2 displaying the mark →.

In the case when the determination at step f19 is "no", the program goes to step f15.

By the arrangement mentioned above, if the total number of the characters to be displayed exceeds the maximum available digits of the display unit 2, any marks → or ← are displayed at the rightmost end position or the leftmost end position of the display unit 2. Whereby, it is possible to notify the operator that there are one or more characters to be displayed but have not yet been displayed on the display unit 2. Advantageously, the characters remaining in the key input buffer can be displayed by operating the cursor keys 15A or 15B. It is an advantage of the device in the embodiments of the present invention that the desired number of characters can be displayed on a small capacity of the display unit without providing an additional display unit by the operation mentioned above.

Although the embodiments of the present invention have been fully described by way of examples and reference to the accompanying drawings, it is to be noted here that various changes and modifications will be apparent to those skilled in the art. Therefore, unless such changes and modifications depart from the scope of the present invention, they should be construed as being included therein.

What is claimed is:

1. A data processing device for processing and displaying data comprising:
    central processing means for processing the data into a plurality of table formats, said plurality of table formats forming the data into a plurality of columns and a plurality of rows:
    identifying means for developing column item names and row item names corresponding to said plurality of columns and said plurality of rows;
    memory means, operably communicative with said central processing means and said identifying means, having a plurality of memory areas for storing the data for said plurality of table formats and said column item names and said row item names;

transposing means, operably communicative with said memory means, for transposing the data of said plurality of columns and said plurality of rows in said plurality of table formats;

operating means, operably communicative with said memory means, for selecting a predetermined number of said plurality of columns and one of said plurality or rows from one of said plurality of memory areas of said memory means corresponding to one of said plurality of table formats;

read means for reading out said predetermined number of columns and said one row of said one table format and said column item name and row item name from said memory means in response to said selection by operating means; and display means, operably communicative with said memory means, for only displaying said predetermined number of columns and said one row of said one table format from said memory means in response to said read means.

2. The data processing device according to claim 1, wherein said display means comprises display control means for determining whether additional columns and rows of the data precedes or follows said predetermined number of columns and said one row being presently displayed by said display means and developing an additional data indicator on said display means in response thereto.

3. The data processing device according to claim 1, further comprising:
means for initiating a predetermined calculation time, coupled to said central processing means;
means for determining whether a predetermined amount of data has been entered in the data processing device by said central processing means during said predetermined calculation time,
means for calculating the data after said means for determining has determined that said predetermined amount of data has been entered in the data processing device by said central processing means; and
means for displaying the data from said means for calculating on said display means.

4. The data processing device according to claim 1, wherein said display means comprises a single line display device.

5. A data processing device for processing and displaying data on a single line display device from a plurality of table formats comprising:

central processing means for processing the data into the plurality of table formats and forming the data into a plurality of columns and a plurality of rows;

identifying means for developing column item names and row item names corresponding to said plurality of columns and said plurality of rows;

memory means, operably communicative with said central processing means and said identifying means, having a plurality of memory area for storing the data for the plurality of table formats and said column item names and said row item names;

operating means, operably communicative with said memory means, for selecting a predetermined number of said plurality of columns and one of said plurality of rows from one of said plurality of memory areas of said memory means corresponding to one of the plurality of table formats;

read means for reading out said predetermined number of columns and said one row of said one table format and said column item names and said row item names from said memory means in response to selection by said operating means; and displaying means, operably communicative with said memory means through said read means, for only displaying said predetermined number of columns and said one row of said one table format on the single line display device.

6. A method for processing data from a plurality of table formats and displaying the data on a single line display device, comprising the steps of:

processing and forming the data into a plurality of table formats of a plurality of columns and a plurality of rows;

developing column item names and row item names corresponding to said plurality of columns and said plurality of rows;

storing the data for the plurality of table formats and said column item names and said row item names in memory means having a plurality of memory areas;

selecting a predetermined number of said plurality of columns and one of said plurality of rows from one of said plurality of memory areas of said memory means corresponding to one of the plurality of table formats;

reading out said predetermined number of columns and said one row of said one table format and said column item names and said row item name from said memory means in response to the step of selecting; and displaying said predetermined number of columns and said one row of said one table format on the single line display device in response to the step of reading out.

* * * * *